United States Patent [19]

Matoba et al.

[11] Patent Number: 5,719,846
[45] Date of Patent: Feb. 17, 1998

[54] DEFORMABLE MIRROR AND METHOD FOR FABRICATING THE SAME AND APPARATUS USING A DEFORMABLE MIRROR

[75] Inventors: Hirotsugu Matoba, Sakurai; Susumu Hirata, Nara-ken; Yorishige Ishii, Yamatotakada; Shingo Abe, Tenri; Hiroshi Onda, Yamatokoriyama; Tetsuya Inui, Nara, all of Japan

[73] Assignee: Sharp Kabushiki Kaisha, Osaka, Japan

[21] Appl. No.: 758,379

[22] Filed: Nov. 29, 1996

[30] Foreign Application Priority Data

Nov. 30, 1995 [JP] Japan ................. 7-312917

[51] Int. Cl.⁶ .............................. G11B 7/00; G02B 26/00
[52] U.S. Cl. .............................. 369/112; 369/58; 359/291
[58] Field of Search .......................... 369/112, 110, 369/109, 118, 94, 58, 32; 359/291, 292

[56] References Cited

U.S. PATENT DOCUMENTS 4,001,635 1/1977 d'Auria et al. .................. 359/291
4,119,368 10/1978 Yamazaki ........................ 359/291
5,202,875 4/1993 Rosen et al. ..................... 369/275.3
5,408,453 4/1995 Holtslag et al. .................. 369/112

FOREIGN PATENT DOCUMENTS 5-151591 6/1993 Japan.

OTHER PUBLICATIONS

"Adaptive Optics for Optimization of Image Resolution", J.P. Gaffard, et al. *Applied Optics*, vol. 26, No. 18, pp. 3772–3777, 1987.

Primary Examiner—Nabil Hindi

[57] ABSTRACT

A deformable mirror for reflecting a light beam incident thereon of the present invention includes: a flexible member which has a reflective surface and is flexibly deformable; a substrate having a reference surface which faces the flexible member; and a driving section for making the flexible member adhere to the reference surface of the substrate, thereby deforming the reflective surface of the flexible member to correspond to the reference surface. The shape of the reference surface is designed in such a manner that the light beam is provided with a spherical aberration when the reflective surface adheres to the reference surface.

19 Claims, 25 Drawing Sheets

DEFORMABLE MIRROR AND METHOD FOR FABRICATING THE SAME AND APPARATUS USING A DEFORMABLE MIRROR

BACKGROUND OF THE INVENTION

1. Field of the Invention

The present invention relates to a deformable mirror having a deformable reflective surface and a method for fabricating the same and an optical apparatus and a recording/reproducing apparatus using the same. More particularly, the present invention relates to a deformable mirror enabling precise recording and reproducing operations with respect to an optical disk including a substrate having an arbitrary thickness and a method for fabricating the same and an optical apparatus and a recording/reproducing apparatus using the same.

2. Description of the Related Art

In recent years, optical disks have been more and more frequently applied to a wide field of applications including audio and video apparatuses and computers, because a large number of information signals can be recorded on an optical disk with a high density. FIG. 32 is a schematic diagram showing an exemplary arrangement of an optical pickup applicable to such apparatuses. In the optical pickup 100 shown in FIG. 32, a light beam 103, emitted from a semiconductor laser device 101, is collimated by a collimator lens 102. After the collimated light beam 103 is incident upon a beam splitter 104, the light beam 103 goes straight through the beam splitter 104, passes through a quarter-wave plate 105 and is incident upon a reflective mirror 106. The optical path of the light beam 103 is bent so as to be incident onto an objective lens 107. The light incident onto the objective lens 107 is converged by the objective lens 107, so that a light spot 109 is formed on an information recording surface of an optical disk 108 supported by a rotational motor 113.

Next, the light beam 110, reflected by the optical disk 108, is returned to the objective lens 107 and passes through the objective lens 107, the reflective mirror 106 and the quarter-wave plate 105 and again is incident upon the beam splitter 104. The reflected light beam 110 is reflected by the polarizing beam splitter 104 because the light beam 110 has a polarization that is different from that of the light beam 103 because light 110 has passed through the quarter-wave plate 105 twice. The reflected light beam 110 from the beam splitter 104 is converged by a converging lens 111 and then received by a photodetector 112. The photodetector 112 detects the intensity of the reflected light beam 110, thereby detecting a reproduced signal.

The objective lens 107 which is usable for an optical pickup having such an arrangement is generally designed in view of the thickness of the optical disk 108. However, in the case where one attempts to apply such an objective lens 107 to an optical disk 108 having a thickness different from the designed value, a spherical aberration is caused, so that the imaging ability thereof degrades and the recording and reproducing operations cannot be performed. In various kinds of conventional optical disks including a compact disk, a video disk and other disks applicable to a magneto-optical disk apparatus of the like conformable to an International Standardization Organization (ISO) standard, the thickness thereof has been set to be substantially the same value (i.e., about 1.2 mm). Thus, it has heretofore been possible for the same optical pickup to record and reproduce information onto/from different kinds of optical disks including a compact disk, a video disk and a magneto-optical disk.

However, in recent years, various kinds of methods have been newly designed for further increasing the recording density of an optical disk. For example, (1) a method for improving an optical resolution of an objective lens by increasing the numerical aperture (NA) thereof, and (2) a method in which multiple recording layers are provided have been proposed.

If the NA of an objective lens is increased in accordance with the method (1), the diameter of a converged beam is decreased in proportion thereto, but it becomes necessary to reduce the substrate thickness of a disk for realizing approximately the same toleration for a disk skew. For example, if the NA of an objective lens is increased from about 0.5 to about 0.6, approximately the same toleration cannot be realized for a disk skew unless the substrate thickness of the disk is reduced from about 1.2 mm to about 0.6 mm.

However, in the case where the substrate thickness of a disk is reduced to such a value, if one attempts to record and reproduce information onto/from a conventional optical disk by using an objective lens corresponding to such an optical disk having a reduced substrate thickness, then the spherical aberration is increased and the light spot on the disk is adversely enlarged, so that it becomes difficult to perform recording and reproducing operations. As a result, since it is no longer possible to maintain a compatibility between such a thin disk and a conventional optical disk, two separate optical pickups must be used for recording and reproducing information onto/from a thin optical disk and a conventional optical disk, respectively.

On the other hand, in the case of using a multi-layer disk in which a plurality of recording layers are provided via a transparent substrate having a certain thickness in accordance with the method (2), the recording capacity per disk is considerably increased. However, since an optical pickup is required to deal with different distances from the objective lens to the respective recording layers, a single optical pickup cannot correctly record and reproduce information onto/from each recording layer in such a multi-layer disk.

As a method for solving such problems, a method for correcting a substrate thickness by using a deformable mirror is known from Japanese Laid-Open Patent Publication No. 5-151591. FIG. 33 is a schematic diagram showing an optical system of a disk apparatus using such a deformable mirror.

As shown in FIG. 33, the beam 103 emitted from the semiconductor laser device 101 passes through the collimator lens 102 to reach the beam splitter 104. The beam 103 has such a polarization that the beam splitter 104 allows the beam 103 to pass through. Thus, the beam 103 passes through the beam splitter 104 and the quarter-wave plate 105 and is incident upon a beam splitter 152. By passing through the quarter-wave plate 105, the polarization of the beam 103 is changed so that the beam 103 can pass through the beam splitter 152. Therefore, the beam 103 also passes through the beam splitter 152 to reach a quarter-wave plate 151.

After passing through the quarter-wave plate 151, the beam 103 reaches a deformable mirror 150. The deformable mirror 150 is a mirror having a deformable reflective surface. When an optical disk 108 having a larger substrate thickness is installed, the surface of the mirror 150 is deformed by a deformable mirror driver circuit 153, thereby applying a spherical aberration to the beam 103, which cancels the spherical aberration caused by the increase in the substrate thickness.

The beam 103, which has been reflected by the deformable mirror 150, returns through the quarter-wave plate 151 and is reflected by the beam splitter 152 to reach the objective lens 107. The light incident upon the objective lens 107 is converged by the objective lens 107 to form the light spot 109 on the surface of an information recording medium or the optical disk 108.

Then, the light beam 110 is reflected by the optical disk 108 and again passes through the objective lens 107 and is incident upon the beam splitter 152. The light beam 110 is reflected by the beam splitter 152 to pass through the quarter-wave plate 151 so that the polarization of the light beam 110 is changed due to the function of the quarter-wave plate 151. Then, the beam 110 is reflected by the deformable mirror 150 and passes through the quarter-wave plate 151 again to be incident on the beam splitter 152. Since the polarization of the beam 110 is changed while passing through the quarter-wave plate 151, the beam 110 is transmitted by the beam splitter 152.

Then, the light beam 110 passes through the quarter-wave plate 105 and is incident upon the beam splitter 104. The light beam 110 is reflected by the beam splitter 104, converged by the converging lens 111 and then received by the photodetector 112. The photodetector 112 detects the intensity of the reflected light beam 110, thereby detecting a reproduced signal.

FIG. 34 illustrates a specific configuration of the deformable mirror 150 described in Japanese Laid-Open Patent Publication No. 5-151591 and "Adaptive Optics for Optimization of Image Resolution" (J. P. Gaffarel et al., Applied Optics, vol. 26, pp. 3772–3777, (1987)).

The deformable mirror 150 includes: a deformable plate 181 having a mirror surface 180 thereon; a plurality of piezoelectric actuators 182 pressing against the reverse surface of the deformable plate 181 at several points; and a base substrate on which the deformable plate 181 and the piezoelectric actuators 182 are fixed. By varying a voltage to be applied to the respective piezoelectric actuators 182, the surface of the deformable plate 181 can be displaced by a desired amount, so that the mirror surface 180 of the deformable plate 181 can be deformed into a desired shape.

However, in a conventional deformable mirror using piezoelectric actuators 182 such as that shown in FIG. 34, whenever the driving voltage is varied, the displacement of the deformable plate 181 is also varied. Particularly, when a variation is caused among the voltages of the piezoelectric actuators 182, the shape of the deformable mirror surface 180 deviates substantially from its desired shape.

In addition, the pressing force of the respective piezoelectric actuators 182 also varies because of thermal expansion caused by the variation in the ambient temperature, so that the shape of the deformable mirror surface 180 adversely deviates from its desired shape.

Furthermore, since the diameter of a light beam, which is subjected to the aberration correction, is about 4 mm, a large number of piezoelectric actuators 182 are required to be provided so as to correspond to one light beam having a diameter of about 4 mm for deforming the deformable mirror into a correct shape. As a result, the assembly process for such a deformable mirror becomes adversely complicated and the size of the entire deformable mirror or the optical pickup is disadvantageously increased because a large number of piezoelectric actuators 182 are required to be fixed and the wiring is required to be extended a longer distance.

SUMMARY OF THE INVENTION

According to one aspect of the present invention, a deformable mirror for reflecting a light beam incident thereon includes a flexible member which has a reflective surface and is flexibly deformable; a substrate having a reference surface which faces the flexible member; and a driving means for making the flexible member adhere to the reference surface of the substrate, thereby deforming the reflective surface of the flexible member to correspond to the reference surface. The shape of the reference surface is designed in such a manner that the light beam is provided with a spherical aberration when the reflective surface adheres to the reference surface.

The flexible member may be arranged above the reference surface of the substrate, while a tensile stress is applied to the reflective surface of the flexible member so that the reflective surface serves as a flat mirror.

In one embodiment of the invention, the driving means includes: an upper electrode and a lower electrode arranged to face each other; and a driver circuit for applying a voltage across the upper electrode and the lower electrode to generate an electrostatic force therebetween. The flexible member includes an upper electrode and the substrate includes the lower electrode, wherein the flexible member adheres to the reference surface of the substrate via the electrostatic force.

In another embodiment of the invention, the driving means includes a soft magnetic layer, which is provided in the flexible member, and a magnetic force generating means. The flexible member adheres to the reference surface of the substrate via a magnetic force.

In still another embodiment of the invention, the driving means includes an air pressure applying means for applying an air pressure to the flexible member.

At least either one of the flexible member and the substrate may include a portion for removing air from a space between the flexible member and the substrate when the flexible member and the substrate adheres to each other. The portion has a groove shape and may be formed on the reference surface of the substrate. Alternatively, the portion may be a tiny hole formed on the flexible member. Alternatively, the portion may be a through hole provided through the substrate.

The deformable mirror may further include a further substrate on which the flexible member is fixed. The further substrate may be single crystalline silicon.

According to another aspect of the present invention, a method of fabricating the above-mentioned deformable mirror includes the steps of: forming a metallic reflective film, which is to serve as the flexible member, on the further substrate by a plating method, wherein a tensile stress is applied to the metallic reflective film; etching away a portion of the metallic reflective film except for a portion corresponding to the reference surface of the substrate, thereby forming an opening; and attaching the further substrate to the substrate so that the opening is placed above the reference surface.

According to still another aspect of the present invention, an optical device includes the above-mentioned deformable mirror and an optical system for making a light beam incident upon the deformable mirror and for receiving the light beam reflected by the deformable mirror.

The deformable mirror may provide the light beam incident thereon with a spherical aberration when being deformed.

The optical system may include a lens which receives the light beam reflected by the deformable mirror, wherein the lens focuses the light beam at a first point when the deformable mirror is not deformed, and wherein the lens focuses the light beam at a second point different from the first point when the deformable mirror is deformed. The light beam may be focused at the first point in a case where the optical members are required for being positionally adjusted with higher precision.

According to still another aspect of the present invention, an apparatus for performing at least one of recording and reproducing operations includes: a light source; a deformable mirror having a reflective surface for reflecting a light beam which is incident on the reflective surface from a direction of the light source, the deformable mirror being capable of providing the light beam with a spherical aberration; and an objective lens for focusing the light beam reflected by the deformable mirror, the objective lens being designed to form a light spot on a first optical recording medium having a first substrate thickness in an appropriate focusing state for the operation of the first optical recording medium. The deformable mirror includes: a flexible member which has the reflective surface and is flexibly deformable; a substrate having a reference surface which faces the flexible member; and a driving means for making the flexible member adhere to the reference surface of the substrate to deform the reflective surface in accordance with the reference surface. The shape of the reference surface is designed to provide the light beam with spherical aberration when the flexible member adheres to the reference surface. The focusing state of the light beam is changed to be appropriate for a second optical recording medium having a second substrate thickness different from the first substrate thickness when the deformable mirror is deformed.

In one embodiment of the invention, the apparatus may further includes a discrimination means for discriminating between the first optical recording medium and the second recording medium, and for instructing the driving means of the deformable mirror to make the flexible member adhere to the substrate when at least one of the recording and the reproducing operations is performed with respect to the second recording medium.

In another embodiment of the invention, when an unknown optical recording medium is installed on the apparatus, the apparatus performs the reproducing operation with respect to the unknown optical recording medium assuming that the unknown optical recording medium is the first optical recording medium, and a means is provided for instructing the driver means of the deformable mirror to make the flexible member adhere to the substrate so as to deform the deformable mirror, when information recorded onto the unknown optical recording medium is not correctly reproduced based on the light beam reflected from the unknown optical recording medium.

The first substrate thickness may be thinner than the second substrate thickness.

Thus, the invention described herein makes possible the advantages of (1) providing a deformable mirror which is highly resistant to variations in an ambient temperature and in an electric circuit, and which deform the mirror surface thereof into a desired shape and hold the shape with high precision and which can further be formed so as to have a smaller size and a simpler configuration at lower costs than conventional devices and a method for fabricating the same, and (2) providing an optical apparatus and a recording and reproducing apparatus using the same.

These and other advantages of the present invention will become apparent to those skilled in the art upon reading and understanding the following detailed description with reference to the accompanying figures.

BRIEF DESCRIPTION OF THE DRAWINGS

FIG. 1A is a schematic cross-sectional view showing a configuration of a deformable mirror in a first example of the present invention, while FIG. 1B is an enlarged cross-sectional view of the flexible member 2 shown in FIG. 1A.

FIG. 11A is a cross-sectional view showing a fifth configuration of the deformable mirror in the first example of the present invention, while

FIG. 12A is a cross-sectional view showing a configuration of a deformable mirror in a second example of the present invention, while

FIG. 14A is a cross-sectional view showing a configuration of a deformable mirror in a third example of the present invention, while

FIG. 16A is a cross-sectional view showing a configuration of a deformable mirror in a fourth example of the present invention, while

FIG. 18A is a cross-sectional view showing a configuration of a deformable mirror in a fifth example of the present invention, while

FIG. 19A is a cross-sectional view showing a configuration of a deformable mirror in a sixth example of the present invention, while

DESCRIPTION OF THE PREFERRED EMBODIMENTS

Hereinafter, the preferred embodiments of the present invention will be described with reference to the accompany drawings.

EXAMPLE 1

Figure 1:
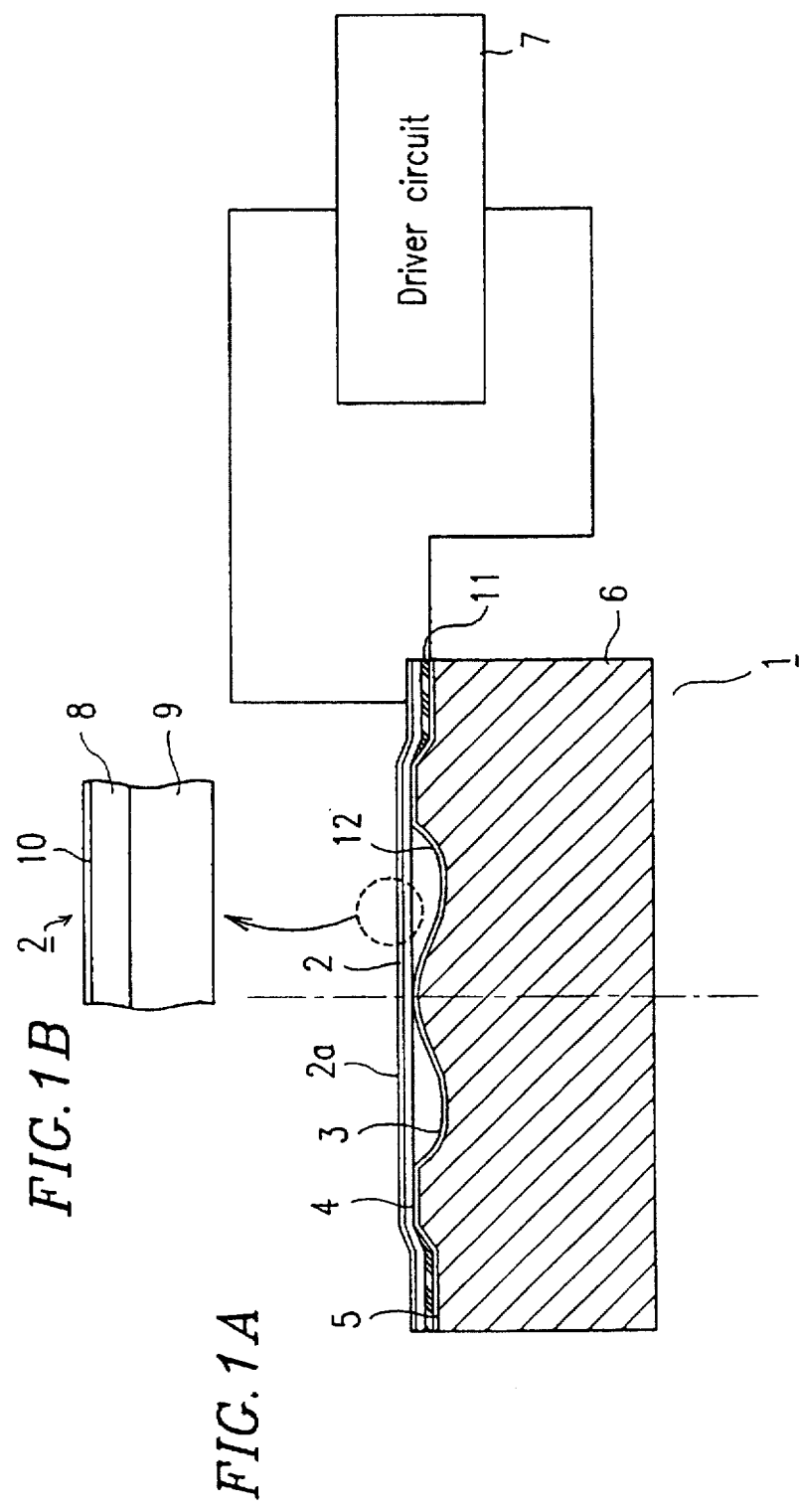

Hereinafter, a deformable mirror according to the first example of the present invention will be described with reference to FIGS. 1A and 1B. FIG. 1A is a principal cross-sectional view showing a schematic configuration of a deformable mirror in a first example of the present invention. FIG. 1B is an enlarged cross-sectional view of a portion of the deformable mirror.

As shown in FIG. 1A, the deformable mirror 1 includes: a flexible member 2 having a mirror surface 2a as a reflective surface thereon; a columnar substrate 6 having an uneven portion 3 as a reference surface, a flat portion 4 and a step-like portion 5 thereon; and a driver circuit 7 as a driving means. The flexible member 2 is secured to the surface of the substrate 6 via an adhesion layer 11 so as to maintain a tension.

Figure 2:
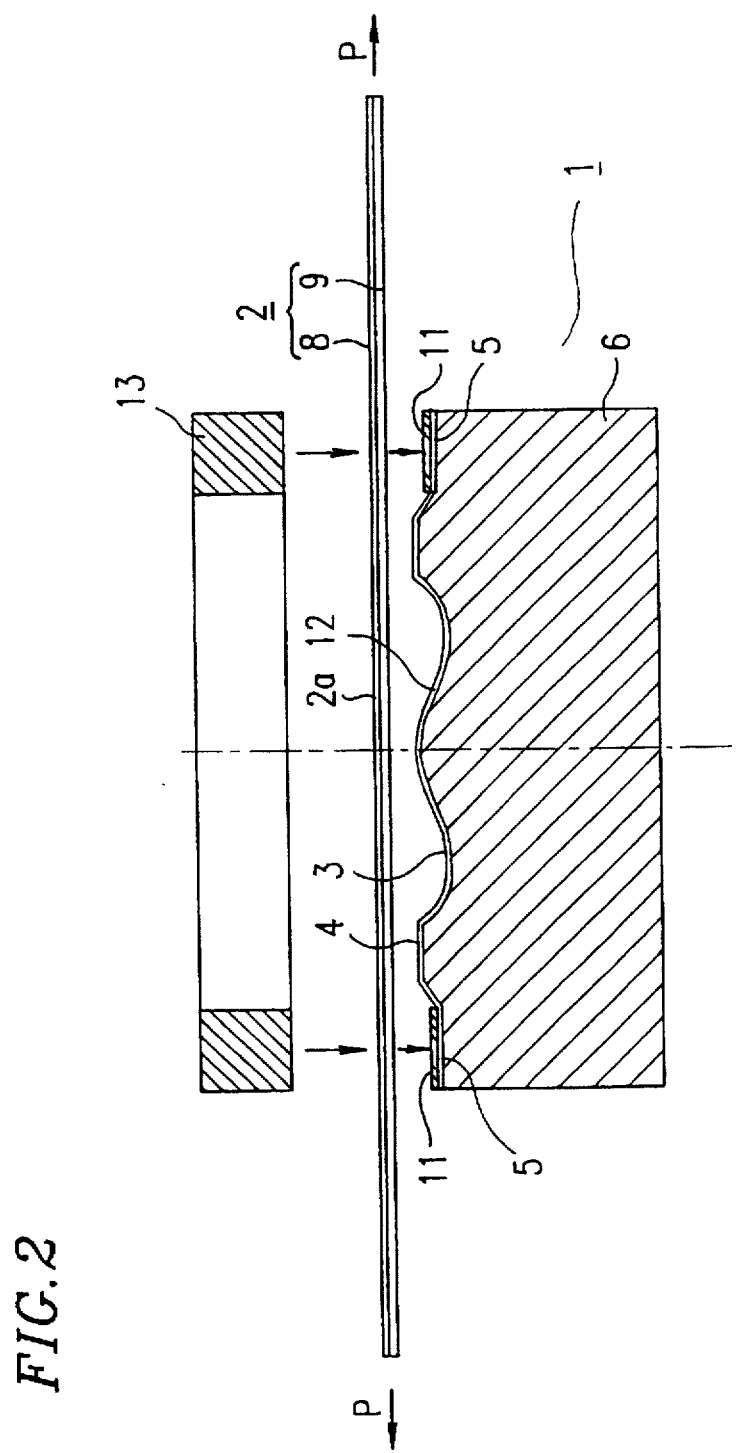
FIG. 2 is an exploded cross-sectional view showing an assembly method for the deformable mirror shown in FIG. 1A.

FIG. 2 is an exploded cross-sectional view illustrating a method for making the flexible member 2 adhere to the substrate 6.

As shown in FIG. 2, the flexible member 2 is pulled by a predetermined peripheral force P and pressed by a predetermined force applied by a jig 13 onto the adhesive layers 11 formed on the step-like portion 5 on the substrate 6 so as to be fixed onto the substrate 6. As a result, the flexible member 2 is placed along the flat portion 4 on the surface of the substrate 6 while maintaining some tension and the mirror surface 2a of the flexible member 2 becomes a flat plane and functions as a plane mirror.

As described above, the flexible member 2 is provided so as to be subjected to a tensile stress. Thus, even when the flexible member 2 expands due to the rise in ambient temperature, the tension absorbs the expansion force, thereby preventing the flexible member from being deformed owing to buckling or the like. On the other hand, even when the temperature falls, the mirror surface 2a can be kept flat because the tension increases. Furthermore, since the eigenfrequency of the flexible member 2 can be increased by applying the tensile stress thereto, it is possible to suppress the influence of an externally applied vibration.

The flexible member 2 includes an upper electrode layer 8 and an insulating layer 9. The upper electrode layer 8 may be formed of a conductive material, such as aluminum, copper, or platinum. In this example, an aluminum film having a thickness of about 1 μm is used as the upper electrode layer 8. In the case of forming the upper electrode layer of a reflective material with no coating formed thereon, the surface of the upper electrode layer can serve as a mirror surface of the deformable mirror 1. Alternatively, as shown in FIG. 1B, the surface of the upper electrode layer 8 may be coated with a reflective film 10 which is made of gold or the like and has been formed on the layer by a vapor deposition method, so that the surface of the reflective film 10 serves as the mirror surface 2a.

The insulating layer 9, which provides the flexibility of the flexible member 2, is formed of a material having a lower Young's modulus than that of any metallic material. In order to obtain a sufficient flexibility, it is preferable that a material having a Young's modulus in the range of about 0.2 GPa to about 5 GPa is used for forming the insulating layer 9. In this example, the insulating layer is made of a polyimide film which has a thickness of about 5 μm and a Young's modulus of 3.4 GPa.

The substrate 6 is formed to have the uneven portion 3, the flat portion 4 and the step-like portion 5 by a glass molding method or a resin molding method allowing for a mass production. As the material for the substrate 6, a material having a high rigidity and a small coefficient of linear expansion, such as a glass material, may be used. In this manner, a possible variation in the shape of the substrate 6 (in particular, the surface of the substrate 6) caused by ambient factors can be suppressed to a minimal level. Thus, the variation in the shape of the mirror surface 2a can also be suppressed, securing the provision of a predetermined amount of highly stable spherical aberration to the light beam incident on the deformable mirror.

A lower electrode layer 12 is formed so as to cover the entire surface (i.e., the uneven portion 3, the flat portion 4 and the step-like portion 5) of the substrate 6. The lower electrode layer 12 may be formed of a conductive material, such as aluminum, copper, or platinum by a sputtering method, for example. In this example, an aluminum film having a thickness of about 1 μm as the lower electrode layer 12 is deposited on the surface of the substrate 6 by a sputtering method.

The upper electrode layer 8 and the lower electrode layer 12 are not only electrically insulated from each other by the insulating layer 9 but also electrically connected to the driver circuit 7. The deformable mirror drive circuit 7 applies a voltage across the upper electrode layer 8 and the lower electrode layer 12 when it is desirable to provide a spherical aberration to a light beam which is being incident onto the deformable mirror 1. On the other hand, when it is desirable to reflect the light beam without providing a spherical aberration, the driver circuit 7 applies no voltage.

Next, the operational principles of this deformable mirror 1 will be described with reference to FIGS. 3 and 4.

Figure 3:
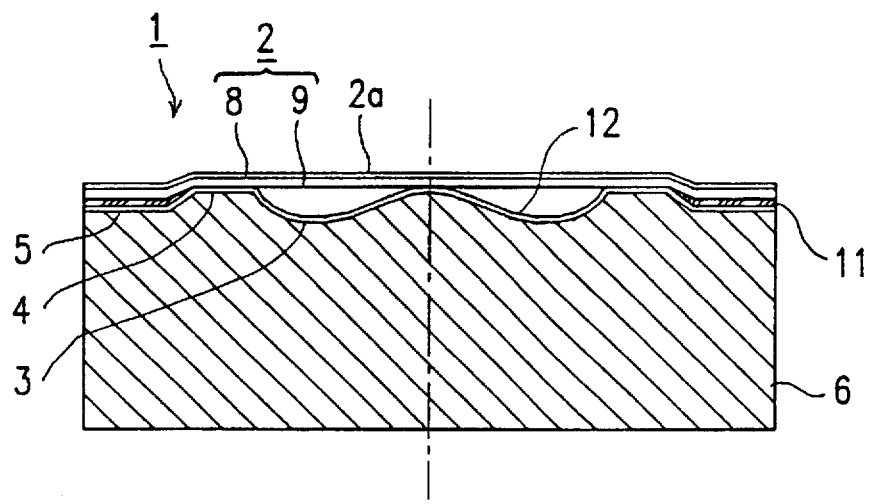
FIG. 3 is a cross-sectional view showing a deformable mirror in a state where no voltage is applied to the deformable mirror.
Figure 4:
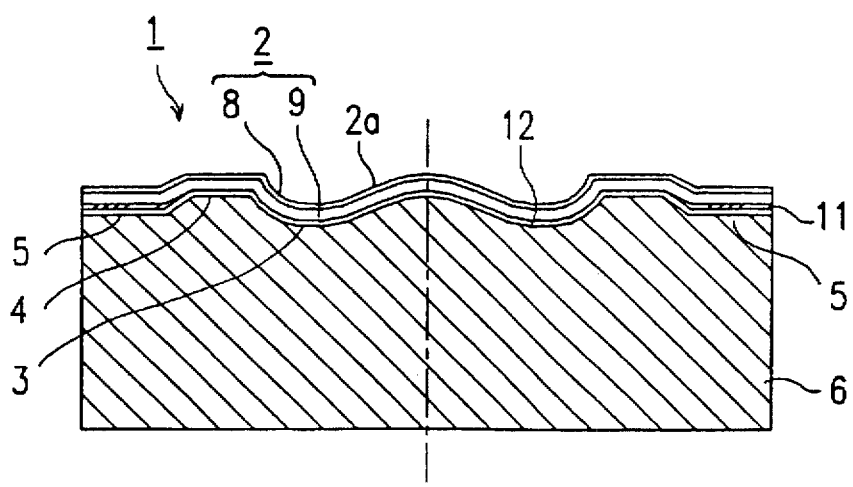
FIG. 4 is a cross-sectional view showing a deformable mirror in a state where a voltage is applied to the deformable mirror.

FIG. 3 shows a state where the deformable mirror 1 reflects the light beam incident thereon without providing it with a spherical aberration, while FIG. 4 shows a state where a spherical aberration is provided to the light beam incident on the deformable mirror 1 when the light beam is reflected by the deformable mirror 1.

In the case where the incident light beam is reflected by the surface of the flexible member 2 of the deformable mirror 1 without being provided with a spherical aberration, the driver circuit 7 does not apply a voltage across the upper electrode layer 8 and the lower electrode layer 12. As a result, the flexible member 2 is kept flat owing to the tension applied thereto, as shown in FIG. 3, and reflects the incident light beam without providing a spherical aberration.

On the other hand, in the case of providing a spherical aberration to the incident light beam, the driver circuit 7 applies a voltage across the upper electrode layer 8 and the lower electrode layer 12. In this case, an electrostatic force is generated between the upper electrode layer 8 of the flexible member 2 and the lower electrode layer 12 on the surface of the substrate 6, so that the flexible member 2 is downwardly deformed toward the substrate 6 to adhere to the uneven portion 3. In this example, the shape of the uneven portion 3 is designed such that the shape of the mirror surface 2a of the flexible member 2 becomes equal to the amount of the spherical aberration to be corrected when the flexible member 2 adhere to the uneven portion 3 owing to the electrostatic force. Therefore, during a voltage application across the upper electrode layer 8 and the lower electrode layer 12, a predetermined spherical aberration is provided to the incoming light beam.

As described above, according to the present invention, the flexible member 2 having the mirror surface 2 thereon adhere to the uneven portion 3 of the substrate 6 by an electrostatic force, and therefore the shape of the mirror surface 2a is determined by the uneven portion 3 of the substrate 6. Since the surface of the substrate 6 can be shaped with high precision to have a designed shape, it is possible to set the spherical aberration to be provided by the mirror surface 2a to the incident light with high precision.

In addition, as described above, the substrate 6 is made of a material having high rigidity and a small coefficient of linear expansion, such as a glass material. Therefore, it is possible to suppress the variation of the uneven portion 3 caused by the environment in the mirror surface 2a to a minimal level and provide a constant spherical aberration to the light incident on the deformable mirror 1. Furthermore, by increasing the electrostatic force making the flexible member 2 adhere to the substrate 6 (i.e., the potential difference to be supplied across the upper electrode layer 8 and the lower electrode layer 12), the flexible member 2 can stably adhere to the uneven portion 3, even when a voltage applied by the driver circuit 7 fluctuates to a certain degree. Moreover, according to the present example, the mirror surface 2a of the deformable mirror 1 can be deformed using a simplified configuration including the upper electrode layer 8 and the lower electrode layer 12.

Furthermore, since a polyimide film, which has a Young's modulus of 3.4 GPa, is used as the insulating layer 9 of the flexible member 2, the force required for making the flexible member 2 adhere to the uneven portion 3 of the substrate 6 by an electrostatic force can be small.

Figure 5A:
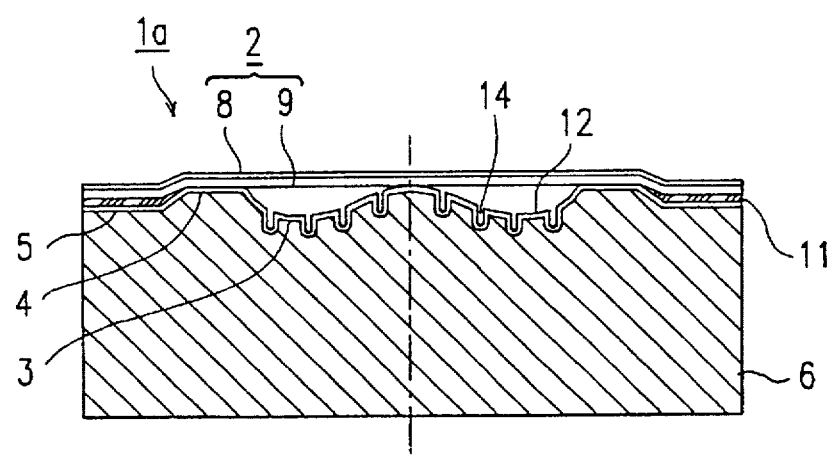
FIGS. 5A and 5B are respectively a cross-sectional view and a plan view showing a deformable mirror having a second configuration in a state where no voltage is applied to the deformable mirror.
Figure 5B:
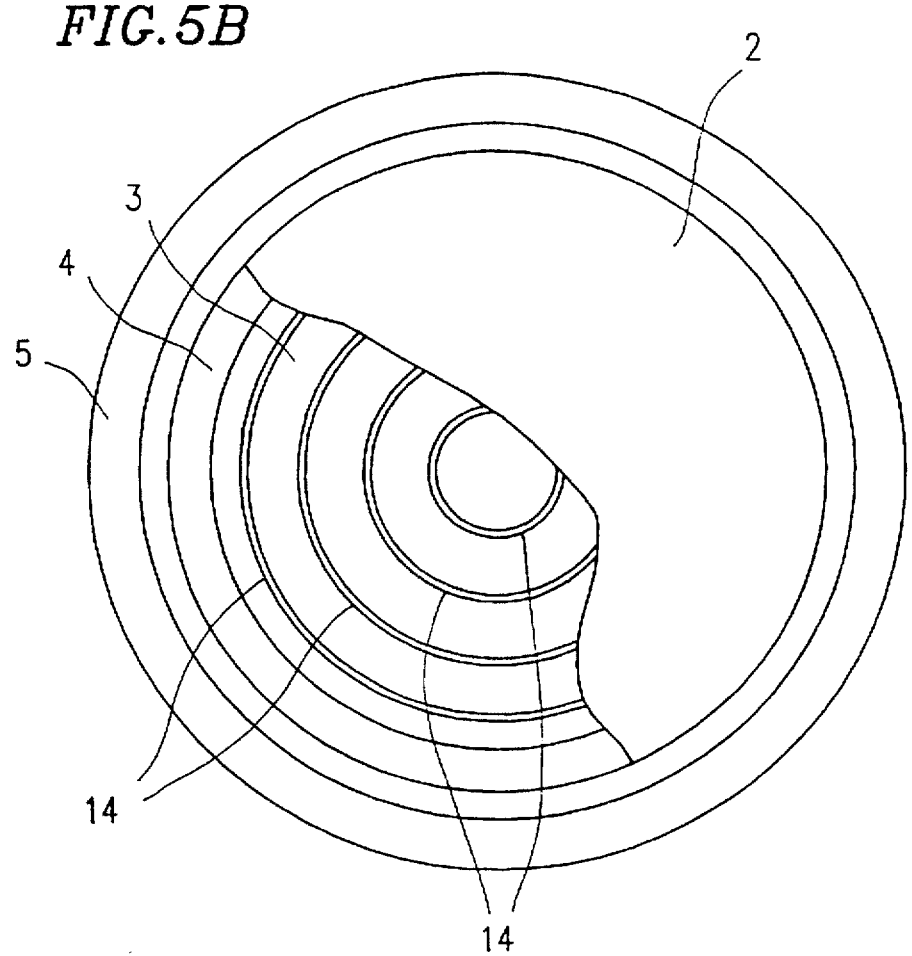
Figure 6:
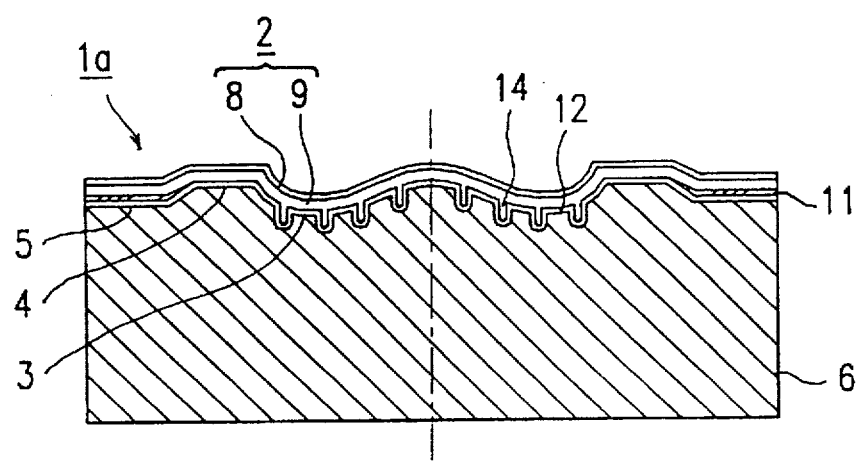
FIG. 6 is a cross-sectional view showing the deformable mirror having the second configuration in a state where a voltage is applied to the deformable mirror.

FIGS. 5A, 5B and 6 are cross-sectional views showing a modification of a deformable mirror in the first example. FIGS. 5A and 5B show a case where a deformable mirror 1a of this modification does not provide a spherical aberration to a light beam incident thereon, while FIG. 6 shows a case where the deformable mirror 1a provides a spherical aberration. In FIGS. 5A and 5B, the same components as those shown in FIGS. 1A and 1B will be identified by the same reference numerals and the description thereof will be omitted herein.

In the deformable mirror 1a, at least one groove portion 14 is formed in the uneven portion 3 of the substrate 6. As shown in FIG. 5B, the groove portion 14 is arranged to be a circle as is viewed from a direction indicated by an arrow in FIG. 5A. In the case of forming a plurality of groove portions 14, they are arranged to be concentric. The width of the groove portion 14 is made relatively narrow, for example, about 2 μm.

In the deformable mirror 1a, when the flexible member 2 adheres to the uneven portion 3, the air, which exists in the gap between the uneven portion 3 and the flexible member 2 facing the uneven portion 3 before the adhesion, is compressed. The groove portion 14 plays a role of accumulating the compressed air. As a result, the flexible member 2 can surely adhere to the uneven portion of the substrate 6.

In the deformable mirror 1a, there is some concern that the flexible member 2 might be deformed by the groove portion 14. However, since the width of the groove portion 14 is as narrow as, for example, about 2 μm as described above, the deformation caused by the groove portion 14 is very small, if any, and is substantially negligible from an optical point of view.

Figure 7:
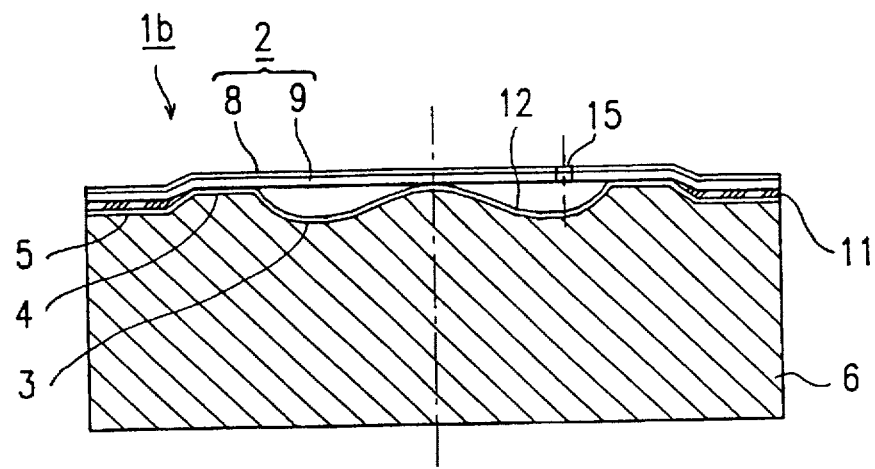
FIG. 7 is a cross-sectional view showing a deformable mirror having still a third configuration in a state where no voltage is applied to the deformable mirror.
Figure 8:
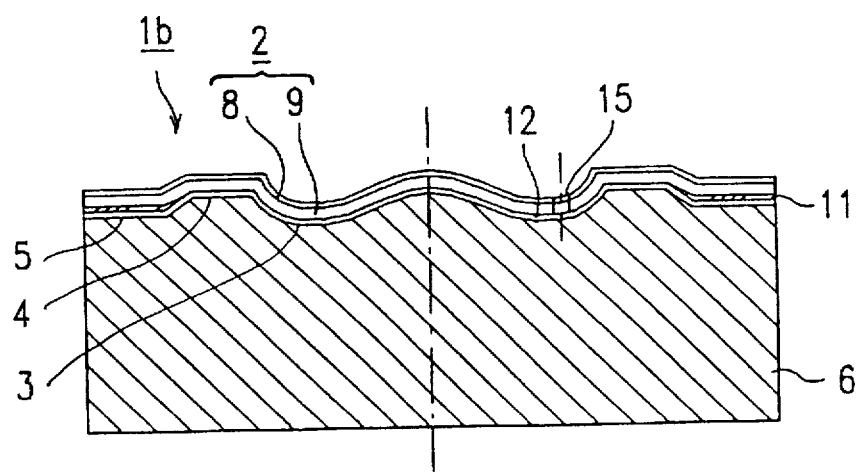
FIG. 8 is a cross-sectional view showing the deformable mirror having the third configuration in a state where a voltage is applied to the deformable mirror.

FIGS. 7 and 8 are cross-sectional views showing another modified configuration of a deformable mirror in the first example. FIG. 7 shows a case where a deformable mirror 1b of this modification does not provide a spherical aberration to the incident light beam, while FIG. 8 shows a case where the deformable mirror 1b provides the spherical aberration. In FIGS. 7 and 8, the same components are those shown in FIGS. 1A and 1B will be identified by the same reference numerals and the description thereof will be omitted herein.

In the deformable mirror 1b, at least one tiny hole 15 is provided through a portion of the flexible member 2 facing the uneven portion 3 of the substrate 6. When the diameter of the tiny hole 15 is too large, the light beam reflected by the mirror surface of the flexible member 2 is adversely affected. Thus, it is preferable to set the diameter of the hole 15 to be about 10 μm or less. As shown in FIG. 8, when the flexible member 2 adheres to the uneven portion 3 by an electrostatic force, the air existing in the gap between the uneven portion 3 and the flexible member 2 before the adhesion is pushed out of the gap through the tiny hole 15. As a result, the flexible member 2 can surely adhere to the uneven portion 3.

In addition to securing the adhesion, the configuration of this modification is advantageous in preventing an undesirable deformation of the flexible member 2. More specifically, in the deformable mirror 1 shown in FIG. 3, for example, when the ambient temperature rises while the deformable mirror 1 is not intended to be deformed, there is a possibility that the expansion of the air existing in the gap between the uneven portion 3 and the flexible member 2 might cause the flexible member 2 to be undesirably deformed and make the flexible member 2 lose its flatness. However, if a tiny hole 15 is provided as in the deformable mirror 1b shown in FIGS. 7 and 8, the expanding air can be pushed out of the gap through this hole 15 even if an expansion of air occurs between the uneven portion 3 and the flexible member 2. Thus, it is possible to prevent an undesirable deformation of the flexible member 2.

Figure 9:
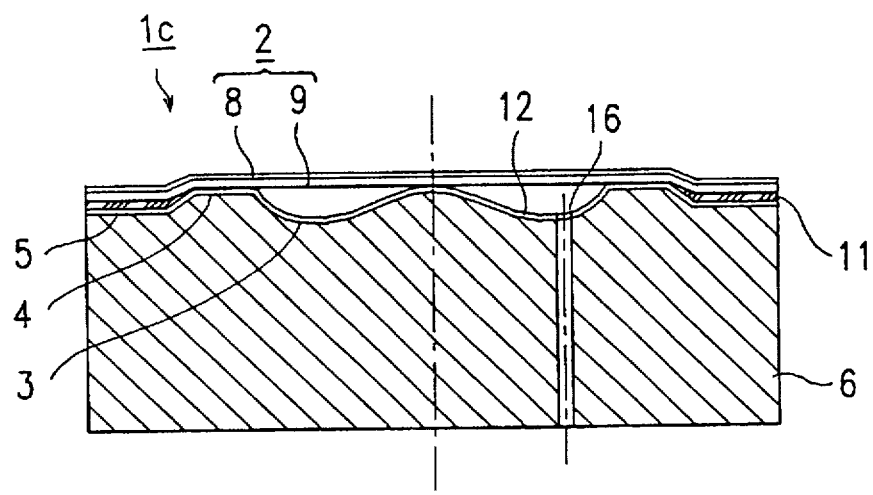
FIG. 9 is a cross-sectional view showing a deformable mirror having a fourth configuration in a state where no voltage is applied to the deformable mirror.
Figure 10:
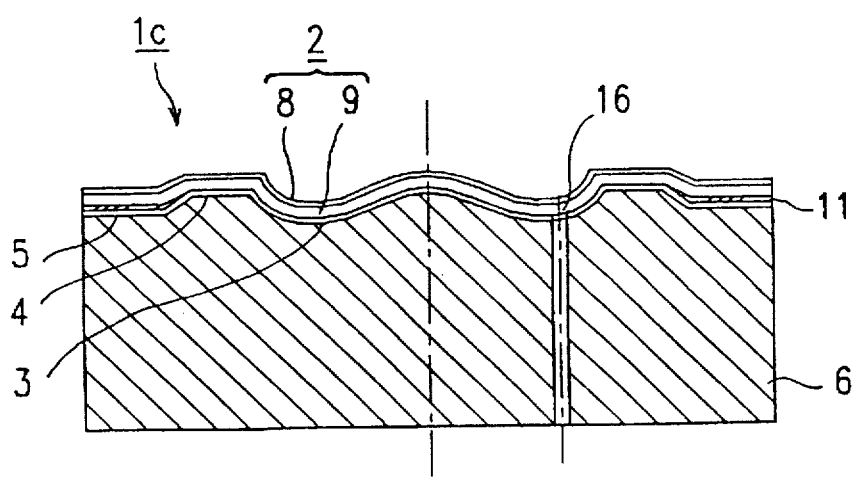
FIG. 10 is a cross-sectional view showing the deformable mirror having the fourth configuration in a state where a voltage is applied to the deformable mirror.

FIGS. 9 and 10 are cross-sectional views showing still another modified configuration of a deformable mirror in the first example. FIG. 9 shows a case where a deformable mirror 1c does not provide a spherical aberration to a light beam incident thereon, while FIG. 10 shows a case where the deformable mirror 1c provides the spherical aberration. In FIGS. 9 and 10, the same components as those shown in FIGS. 1A and 1B will be identified by the same reference numerals and the description thereof will be omitted herein.

In the deformable mirror 1c of this modification, a through hole 16 enabling air to escape to a region outside the gap is provided in a part of the uneven portion 3 of the substrate 6. If the diameter of this through hole 16 is too large, the flexible member 2 is likely to be deformed in the part including this hole when the flexible member 2 adheres to the uneven portion 3. Thus, the diameter of the hole 16 is preferably about 30 µm or less. The function of this through hole 16 is the same as that of the tiny hole 15 shown in FIGS. 7 and 8.

In the first example and three modifications thereof, a case where an insulating substrate, such as a glass substrate, a resin substrate or the like is used as the substrate 6 has been described. Alternatively, the deformable mirror can be implemented even when the substrate 6 is made of a material having an electrical conductivity.

Figure 11A:
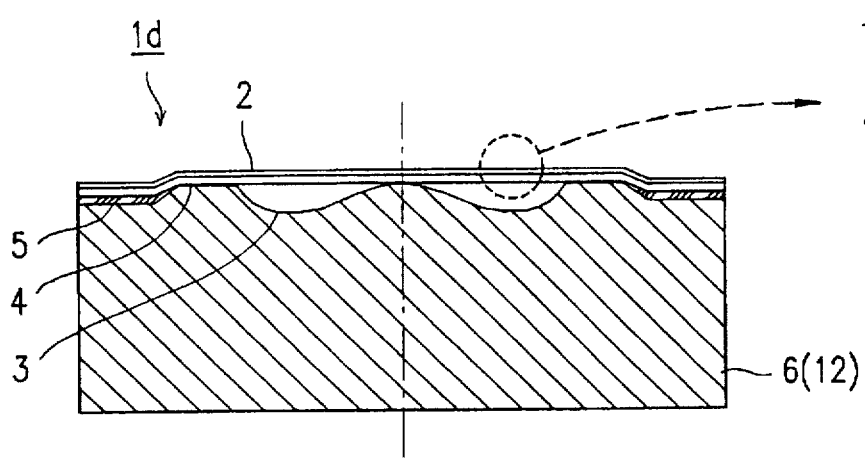
Figure 11B:
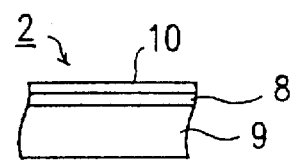
FIG. 11B is an enlarged cross-sectional view of the flexible member shown in FIG. 11A.

FIG. 11A is a cross-sectional view showing a configuration of a deformable mirror 1d in which the substrate 6 is made of a material having some electrical conductivity. FIG. 11B is an enlarged view of a portion of the deformable mirror 1d. This substrate 6 is formed by cutting a metallic material or by molding a resin into which carbon fiber having an electrical conductivity has been mixed so as to realize a substrate suitable for mass production. Thus, the substrate 6 has an electrical conductivity. Therefore, the wiring which was connected to the lower electrode layer 12 for applying a voltage causing an electrostatic force can be directly connected to the substrate 6, so that the substrate 6 can function as the lower electrode. As a result, it is no longer necessary to form the lower electrode layer 12 on the substrate 6, thereby simplifying the fabrication process. In addition, since the substrate 6 itself can function as the lower electrode, it is no longer necessary to extend the wiring from the fine lower electrode 12 for connecting the lower electrode 12 to an external circuit as in the case shown in FIG. 1A.

EXAMPLE 2

Figure 12A:
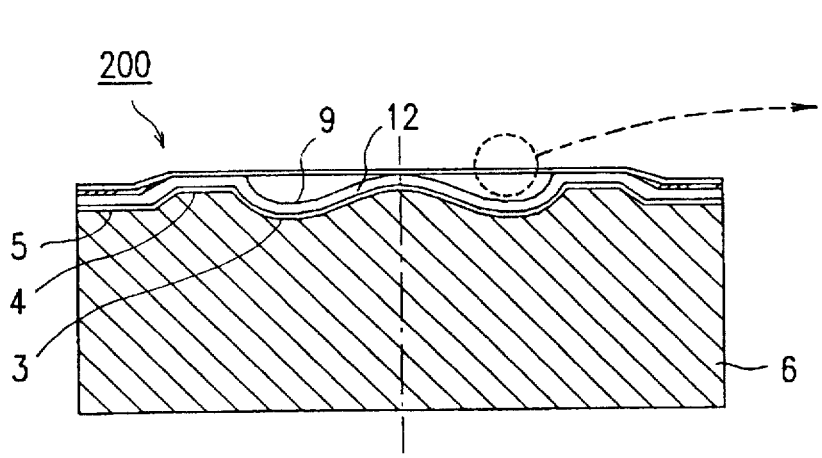
Figure 12B:
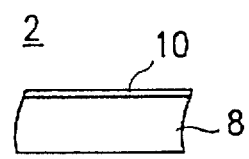
FIG. 12B is an enlarged cross-sectional view of the flexible member shown in FIG. 12A.

Referring to FIGS. 12A and 12B, a deformable mirror in a second example of the present invention will be described.

FIG. 12A is a cross-sectional view showing a configuration of a deformable mirror 200 in this example. FIG. 12B is an enlarged cross-sectional view of a portion of the deformable mirror 200. In FIGS. 12A and 12B, the same components as those shown in FIGS. 1A and 1B will be identified by the same reference numerals and the description thereof will be omitted herein.

In this example, as is apparent from FIGS. 12A and 12B, the deformable mirror 200 is different from that described in Example 1 in that an insulating layer 9, which insulates an upper electrode layer 8 from a lower electrode layer 12, is disposed on a substrate 6, that is, a flexible member 2 includes an upper electrode layer 8 coated with a reflective film 10. The upper electrode layer 8 is formed, for example, of a nickel film having a thickness of about 5 µm. The surface of the upper electrode layer 8 may be directly used as a reflective mirror surface. Alternatively, as shown in FIG. 12B, the upper electrode layer 8 may be coated with the reflective film 10 made of gold, aluminum or the like by a vapor deposition method. In this case, the surface of the reflective film 10 serves as the reflective mirror surface 2a.

In the second example, the flexibility of the flexible member 2 is brought about by the upper electrode layer 8. For obtaining a sufficient flexibility, it is preferable that the upper electrode layer 8 is formed of a conductive material having a Young's modulus in the range of about 25 GPa to 90 GPa. In this example, the nickel film having a Young's modulus of 80 GPa is used for forming the upper electrode layer 8.

A substrate 6 is formed to have an uneven portion 3, a flat portion 4 and a step-like portion 5 by, for example, a glass molding method or a resin molding method. The substrate is formed of a material having a large rigidity and a small coefficient of linear expansion, as in the first example. A lower electrode layer 12 is formed on the surface of the substrate 6 and than an insulating layer 9 is formed thereon. The lower electrode layer 12 can be formed by depositing an aluminum film having a thickness of about 1 µm on the surface of the substrate 6 by a sputtering method, for example. The insulating layer 9 can be formed by depositing silicon oxide having a thickness of about 1 µm on the surface of the lower electrode layer 12 by a sputtering method as well, for example.

In the second example, since the insulating layer 9 is provided for the substrate 6, the insulating layer 9 is no longer required to have flexibility, so that it is possible to reduce the thickness of the insulating layer 9. Accordingly, the distance between the upper electrode layer 8 and the lower electrode layer 12 can also be reduced. An electrostatic force generated between two electrodes facing each other is inversely proportional to the square of the distance between the two electrodes. Thus, if the distance between the two electrodes is reduced as in this example, then it is possible to reduce an applied voltage required for making the flexible member 2 adhere to the uneven portion 3 of the substrate 6.

Figure 13:
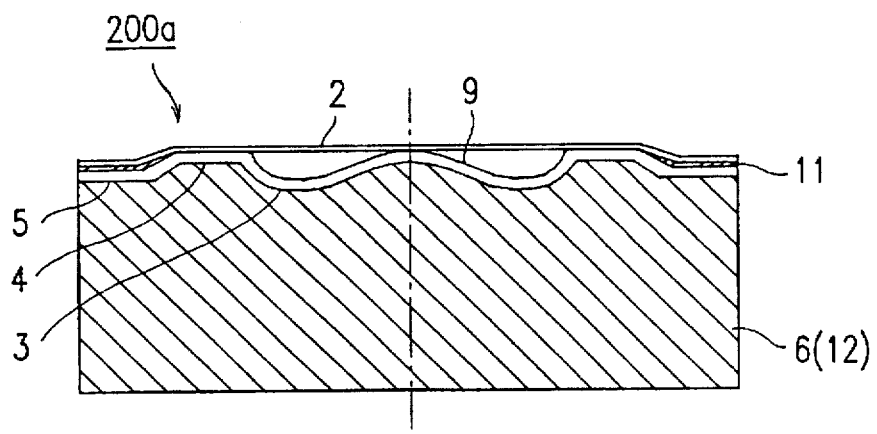
FIG. 13 is a cross-sectional view showing a case where a substrate having a conductance is used for the deformable mirror shown in FIG. 12A.

In this example, if the substrate 6 is formed by cutting some metallic material or by molding a resin into which carbon fiber has been mixed so as to have some electrical conductivity, then the substrate 6 itself can function as the lower electrode and it becomes easier to connect the deformable mirror 200a to an external circuit, as shown in FIG. 13.

Moreover, the deformable mirror 200 may be modified as in the modifications of Example 1. In this case, the advantageous effects described in the above modifications can also be obtained.

EXAMPLE 3

Figure 14A:
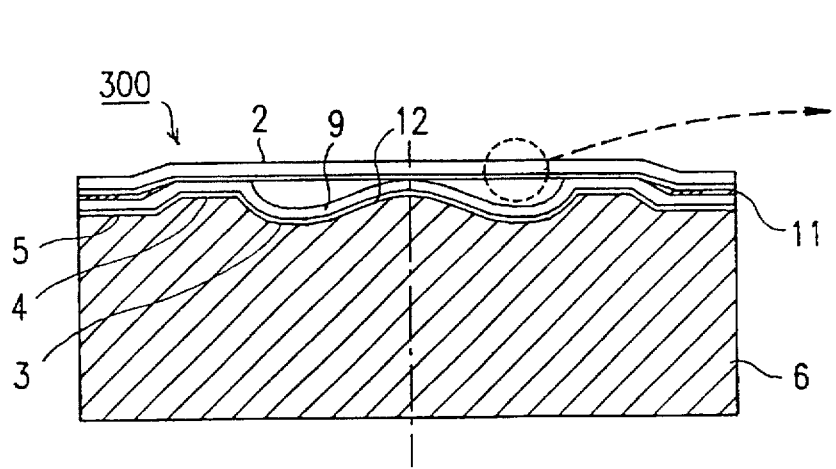
Figure 14B:
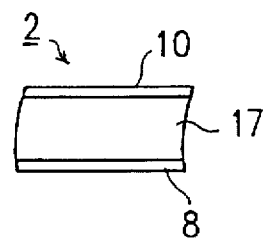
FIG. 14B is an enlarged cross-sectional view of the flexible member 2 shown in FIG. 14A.

Referring to FIGS. 14A and 14B, a deformable mirror in a third example of the present invention will be described.

FIG. 14A is a cross-sectional view showing a configuration of a deformable mirror 300 in this example. FIG. 14B is an enlarged view of a portion of the deformable mirror 300. In FIGS. 14A and 14B, the same components as those used in FIGS. 1A through 13 will be identified by the same reference numerals and the description thereof will be omitted herein.

The deformable mirror 300 is similar to that of the second example in that the insulating layer 9 is formed on the substrate 6. However, the flexible member 2 includes a polymer film 17, which provides the flexibility of the flexible member 2, in addition to the upper electrode layer 8 and the reflective film 10. The polymer film 17 is formed of a material having a Young's modulus in the range of about 0.2 GPa to about 5 GPa, for example, a polyimide film having a Young's modulus of 3.4 GPa. In this example, a polyimide film having a thickness of about 10 μm was formed as the polymer film 17.

As shown in FIG. 14B, the reflective film 10, which is made of gold, aluminum, nickel or the like, is formed on one surface of the polymer film 17. The reflective film 10 serves as a mirror surface for the deformable mirror 300. The upper electrode layer 8 can be formed by depositing an aluminum film having a thickness of about 1 μm on the other surface of the polymer film 17 by a vapor deposition method, for example. The thus formed flexible member 2 is arranged in such a manner that the upper electrode layer 8 faces the surface of the substrate 6.

The substrate 6 is formed to have the uneven portion 3, the flat portion 4 and the step-like portion 5 by, for example, a glass molding method or a resin molding method. The substrate 6 is made of a material having a high rigidity and a small coefficient of linear expansion. A lower electrode layer 12 is formed on the surface of the substrate 6 to cover the uneven portion 3, the flat portion 4 and the step-like portion 5, and then an insulating layer 9 is formed thereon. The lower electrode layer 12 can be formed by depositing an aluminum film having a thickness of about 1 μm on the surface of the substrate 6 by a sputtering method, for example. The insulating layer 9 can be formed by depositing silicon oxide having a thickness of about 1 μm on the surface of the lower electrode layer 12 by a sputtering method, for example.

In the third example, since the insulating layer 9 for insulating the upper electrode layer 8 and the lower electrode layer 12 is provided for the substrate 6, it is possible to reduce the thickness of the insulating layer 9. Accordingly, it is also possible to reduce the distance between the upper electrode layer 8 and the lower electrode layer 12. An electrostatic force generated between two electrodes facing each other is inversely proportional to the square of the distance between the two electrodes. Thus, in this example, even if a potential difference between the upper electrode 8 and the lower electrode 12 is reduced, a sufficiently large electrostatic force can be applied to the flexible member 2.

In addition, since the flexibility of the flexible member 2 is brought about by the polymer film 17 having a smaller Young's modulus than that of any metallic material, the Young's modulus of the entire flexible member 2 can be reduced while decreasing the thickness of the upper electrode layer 8. As a result, even a small driving force can make the flexible member 2 adhere to the uneven portion 3 of the substrate 6.

Figure 15:
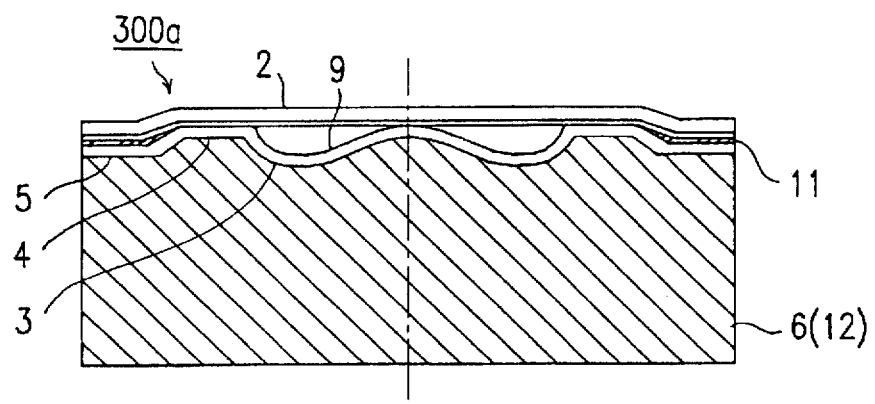
FIG. 15 is a cross-sectional view showing a case where a substrate having a conductance is used for the deformable mirror shown in FIG. 14A.

In this example, if the substrate 6 is formed by cutting some metallic material or by molding a resin into which carbon fiber has been mixed so as to have some electrical conductance, then the substrate 6 itself can function as the lower electrode of the deformable mirror 300a, as shown in FIG. 15. In such a case, it is no longer necessary to extend the wiring from the lower electrode for connecting the lower electrode to an external circuit.

Moreover, the deformable mirror 300 may be modified as in the modifications of Example 1. In this case, the advantageous effects described in the above modifications can also be obtained.

EXAMPLE 4

Figure 16A:
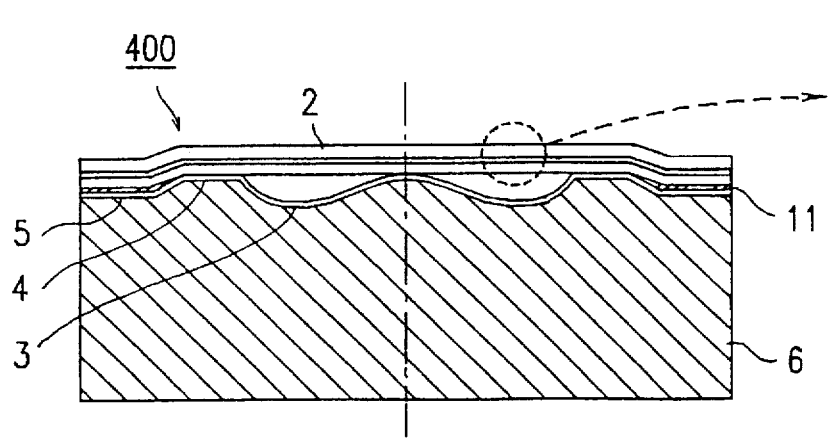
Figure 16B:
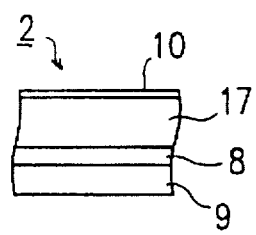
FIG. 16B is an enlarged cross-sectional view of the flexible member shown in FIG. 16A.

Referring to FIGS. 16A and 16B, a deformable mirror in a fourth example of the present invention will be described. In FIGS. 16A and 16B, the same components as those shown in FIGS. 1A through 15 will be identified by the same reference numerals and the description thereof will be omitted herein.

FIG. 16A is a cross-sectional view showing a configuration of a deformable mirror 400 in this example. FIG. 16B is an enlarged view of a portion of the deformable mirror 400.

The flexible member 2 includes the polymer film 17, the upper electrode layer 8, the insulating layer 9 and the reflective film 10. The polymer film 17 is formed of a material having a Young's modulus smaller than any metallic material so that flexibility of the flexible member 2 is brought about by the polymer film 17. Preferably, a material having a Young's modulus in the range of about 0.2 GPa to about 5 GPa is used for forming the polymer film 17. For example, polyimide, polyethylene, or polystyrene may be used as the material for the polymer film 17. In this example, a polyimide film which has a Young's modulus of 3.4 GPa and a thickness of about 10 μm is used.

As shown in FIG. 16B, the reflective film 10, which may be made of gold, aluminum, nickel or the like, is formed on one surface of the polymer film 17. The reflective film 10 serves as the mirror surface 2a. On the other surface of the polymer film 17 is disposed the upper electrode layer 8, which may be made of a metallic material deposited by a vapor deposition method. In this example, an aluminum film having a thickness of about 1 μm is deposited as the upper electrode layer 8. Then, the insulating layer 9 is formed on the upper electrode layer 8, by, for example, depositing silicon oxide having a thickness of about 1 μm by a sputtering method. As shown in FIG. 16B, the thus formed flexible member 2 is arranged in such a manner that the surface on which the upper electrode layer 8 and the insulating layer 9 are formed faces the surface of the substrate 6 having the uneven portion 3, the flat portion 4 and the step-like portion 5.

The substrate 6 is formed by a glass molding method so as to have the uneven portion 3, the flat portion 4 and the step-like portion 5, as in the previous examples. Then, the lower electrode layer 12 is formed on the surface of the substrate 6 to cover the portions 3, 4 and 5. The lower electrode layer 12 is formed of a conductive material such as aluminum, copper, platinum or the like, by a sputtering method, for example. In this example, an aluminum film was deposited to have a thickness of about 1 μm as the lower electrode layer 12.

In the fourth example, the flexibility of the flexible member 2 is brought about by the polymer film 17, as described above. Thus, it is possible to reduce the thickness of the insulating layer 9 located between the upper electrode layer 8 and the lower electrode layer 12. Accordingly, it is also possible to reduce the distance between the electrode layers 8 and 12. An electrostatic force generated between two electrode layers facing each other is inversely proportional to the square of the distance between the two electrode layers. Thus, in this example, it is possible to reduce an applied voltage required for making the flexible member 2 adhere to the uneven portion 3 of the substrate 6.

In addition, the Young's modulus of the polymer film 17 is smaller than that of any metallic material, as described above. Therefore, the Young's modulus of the entire flexible member 2 can be reduced while decreasing the thicknesses of the upper electrode layer 8 and the insulating layer 9. As a result, even a small driving force can make the flexible member 2 adhere to the uneven portion 3 of the substrate 6.

Figure 17:
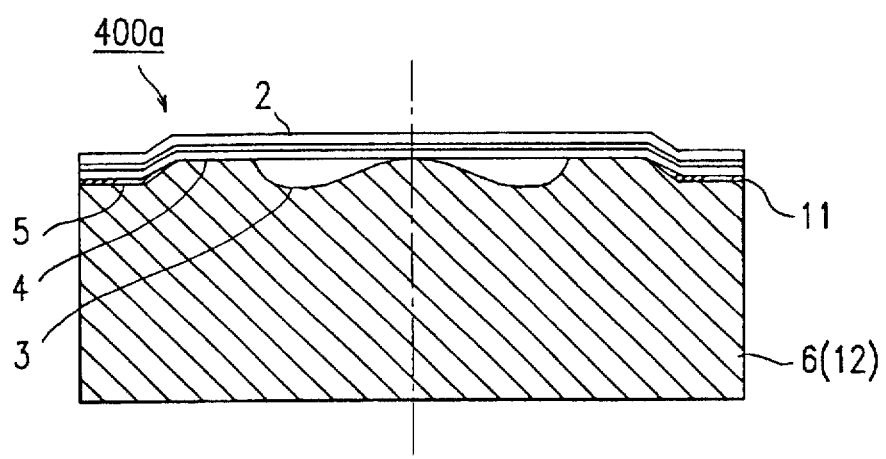
FIG. 17 is a cross-sectional view showing a case where a substrate having a conductance is used for the deformable mirror shown in FIG. 16A.

In the fourth example, the substrate 6 is formed by the glass molding. However, a material of the substrate 6 and a method for fabricating the substrate 6 are not limited thereto. The substrate 6 may be formed by cutting some metallic material or by molding a resin into which carbon fiber has been mixed so as to have some electrical conductivity, then the substrate 6 itself can function as the lower electrode of the deformable mirror 400a, as shown in FIG. 17. In such a case, it is no longer necessary to extend the wiring from the lower electrode for connecting the lower electrode to an external circuit.

Moreover, the deformable mirror 400 may be modified as in the modifications of Example 1. In this case, the advantageous effects described in the above modifications can also be obtained.

EXAMPLE 5

Figure 18A:
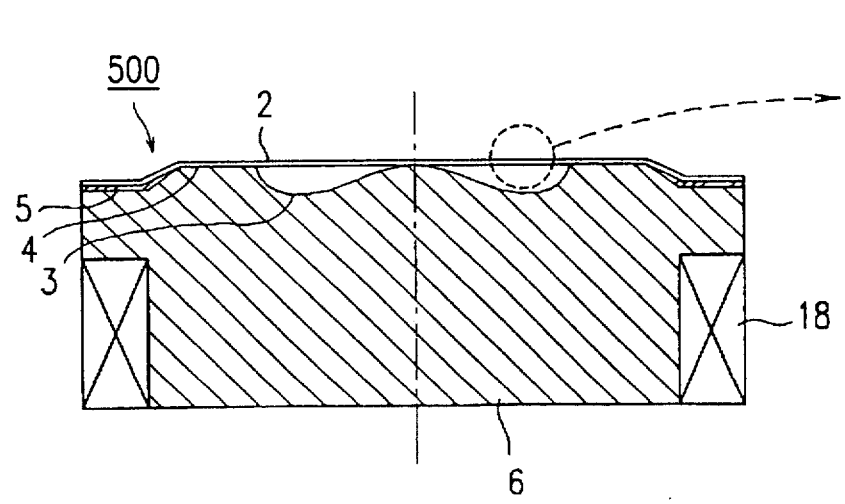
Figure 18B:
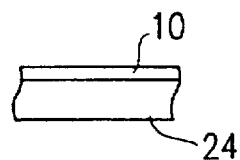
FIG. 18B is an enlarged cross-sectional view of the flexible member shown in FIG. 18A.

Referring to FIGS. 18A and 18B, a deformable mirror in a fifth example of the present invention will be described. In FIGS. 18A and 18B, the same components as those shown in the FIGS. 1A through 17 will be identified by the same reference numerals and the description thereof will be omitted herein.

FIG. 18A is a cross-sectional view showing a configuration of a deformable mirror 500 in this example. FIG. 18B is an enlarged view of a portion of the deformable mirror 500.

As shown in FIG. 18B, the flexible member 2 includes a soft magnetic layer 24 and the reflective film 10 formed thereon. The soft magnetic layer 24 may be made of permalloy, sendust, or the like, which brings about the flexibility of the flexible member 2. The reflective film 10 may be made of gold, aluminum, nickel or the like and the surface of the reflective film 10 serves as the mirror surface 2a.

The substrate 6 is formed to have the uneven portion 3, the flat portion 4 and the step-like portion 5 by a glass molding method or a resin molding method, for example, as in the previous examples. The substrate 6 may be formed of a material having a high rigidity and a small coefficient of linear expansion, such as a glass material. Furthermore, an electromagnetic coil 18 is wound around the substrate 6.

The deformable mirror 500 is different from those described in the previous examples in that the deformation of the mirror surface is caused by an electromagnetic force. More specifically, in order to deform the deformable mirror 500, a current is supplied from the driver circuit 7 to the electromagnetic coil 18, thereby causing a magnetic field. The magnetic field causes the flexible member 2 having the soft magnetic layer 24 to be deformed toward the substrate 6 so that the flexible member 2 adheres the to the uneven portion of the substrate 6 by the electromagnetic force. It is preferable to form the substrate 6 using a soft magnetic material. In this case, an even larger electromagnetic force can be generated.

In accordance with this configuration, the mirror surface 2a adheres to the uneven portion 3 by the electromagnetic force and the shape of the mirror surface 2a is determined by the uneven portion 3 which can be shaped with high precision, so that it is possible to set the spherical aberration to be applied by the mirror surface 2a to the light, which is incident on the deformable mirror 500, with high precision.

In addition, by forming the substrate 6 of a material having a large rigidity and a small coefficient of linear expansion, such as a glass material, it is possible to suppress the variation caused by the environment in the mirror surface 2a to a minimal level and apply a constant spherical aberration to the incident light. Furthermore, in the case where the electromagnetic force causing the flexible member 2 to adhere to the substrate 6 has been increased by, for example, forming the substrate 6 of a soft magnetic material, even when a voltage applied by the driver circuit 7 is varied to a certain degree, the flexible member 2 can still stably adhere to the uneven portion 3.

Moreover, the deformable mirror 500 may be modified as in the modifications of Example 1. In this case, the advantageous effects described in the above modifications can also be obtained.

EXAMPLE 6

Figure 19A:
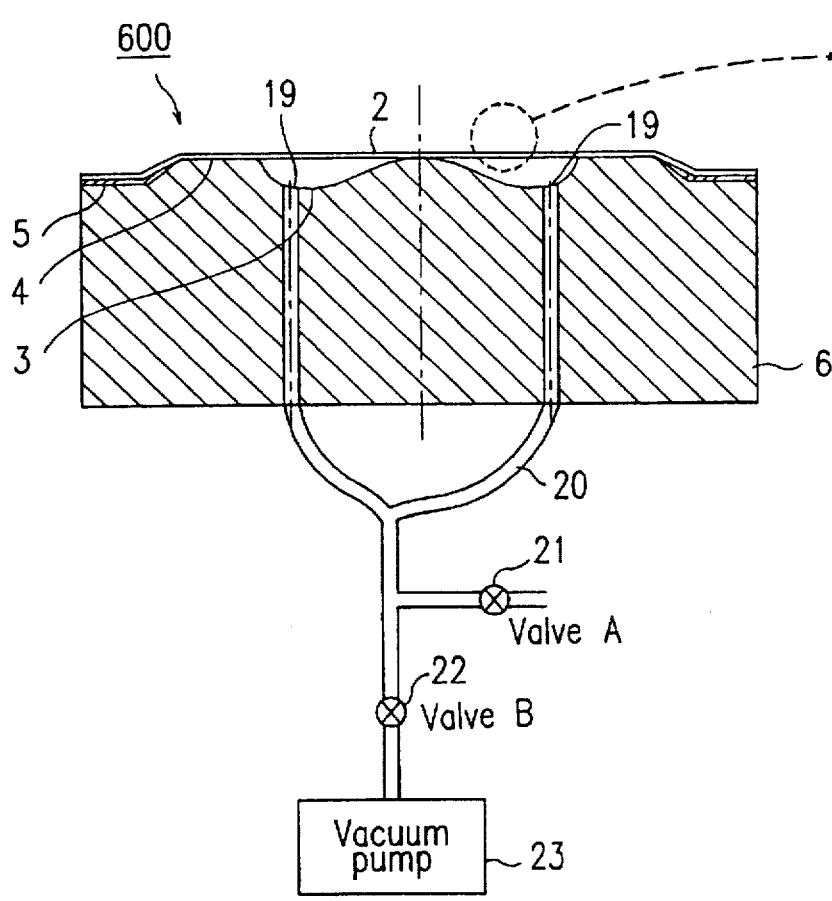
Figure 19B:
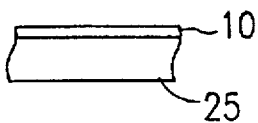
FIG. 19B is an enlarged cross-sectional view of the flexible member shown in FIG. 19A.

Referring to FIGS. 19A and 19B, a deformable mirror in a sixth example of the present invention will be described.

FIG. 19A is a cross-sectional view showing a configuration of a deformable mirror 600 in this example. FIG. 19B is an enlarged view of a portion of the deformable mirror 600. In this example, the same components as those used in the first to the fifth examples will be identified by the same reference numerals and the description thereof will be omitted herein.

The flexible member 2 includes a flexible material layer 25 and the reflective film 10 formed thereon, as shown in FIG. 19B. The flexible material layer 25 may be formed of a metallic film, a polymer film or the like. The reflective film 10 may be made of gold, aluminum, nickel or the like.

The substrate 6 is formed to have the uneven portion 3, the flat portion 4 and the step-like portion 5 by a glass molding method or a resin molding method, for example, as in the previous examples. The substrate 6 may be formed of a material having a large rigidity and a small coefficient of linear expansion, such as a glass material. Furthermore, at least one inlet port 19 is formed through a part of the uneven portion 3, as shown in FIG. 19A. An inlet tube 20, extending to the outside of the deformable mirror 600, is connected to the inlet port 19. The connection tube 20 branches into two paths. One of the paths communicates with the air via a valve 21, while the other path communicates with a vacuum pump 23 via a valve 22.

When the deformable mirror 600 is not deformed, the valve 21 is opened and the valve 22 is closed. In such a state, the pressure in the gap between the flexible member 2 and the uneven portion 3 of the substrate 6 is the same as the atmospheric pressure and the tension of the flexible member 2 keeps the mirror surface 2a flat. On the other hand, when the deformable mirror 600 is deformed, the valve 21 is closed and the valve 22 is opened in accordance with an instruction given by the driver circuit 7. As a result, the pressure in the gap between the flexible member 2 and the uneven portion 3 of the substrate 6 becomes lower, so that the atmospheric pressure causes the flexible member 2 to be pressed onto the uneven portion 3 of the substrate 6.

In accordance with this configuration, the surface of the reflective mirror 10, which serves as a mirror surface 2a, adheres to the uneven portion 3 of the substrate 6 and the shape of the mirror surface 2a is determined by the uneven portion 3 of the substrate 6 which can be shaped with high precision, as described in Example 1. Therefore, it is possible to adjust the spherical aberration to be applied by the mirror surface 2a to light, which is incident on the deformable mirror 600, with high precision.

In addition, by forming the substrate 6 of a material having a large rigidity and a small coefficient of linear expansion, such as a glass material, it is possible to suppress the variation caused by the environment in the mirror surface 2a to a minimal level and apply a constant spherical aberration to the incident light.

EXAMPLE 7

Referring to FIGS. 20 to 27, a deformable mirror in a seventh example of the present invention will be described. In this example, the same components as those used in the previous examples will be identified by the same reference numerals and the description thereof will be omitted herein.

Figure 20:
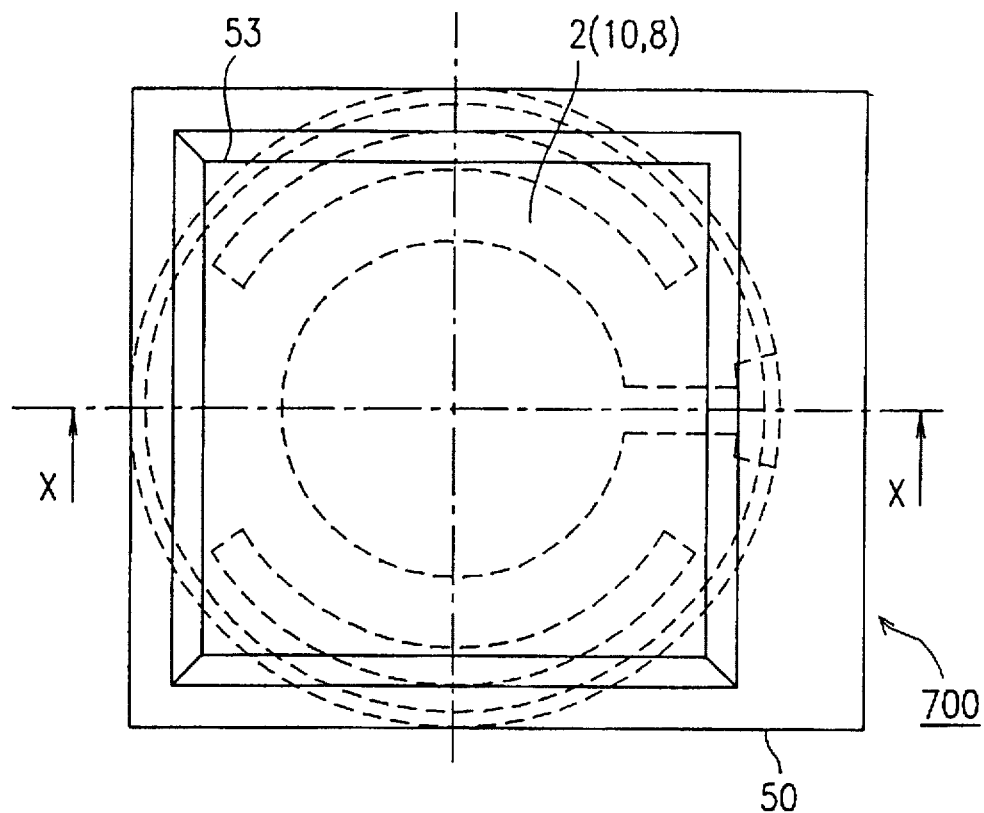
FIG. 20 is a plan view of a deformable mirror in a seventh example of the present invention as seen from above the flexible member thereof.
Figure 21:
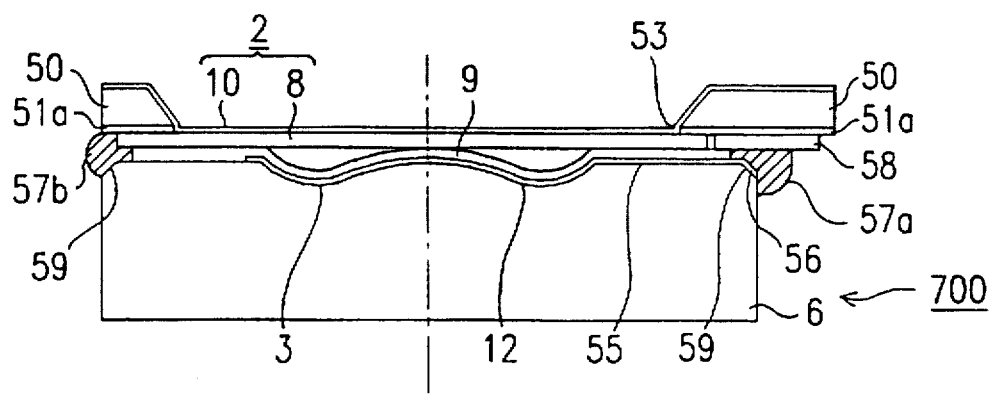
FIG. 21 is a cross-sectional view showing a configuration of the deformable mirror in the seventh example of the present invention.
Figure 22:
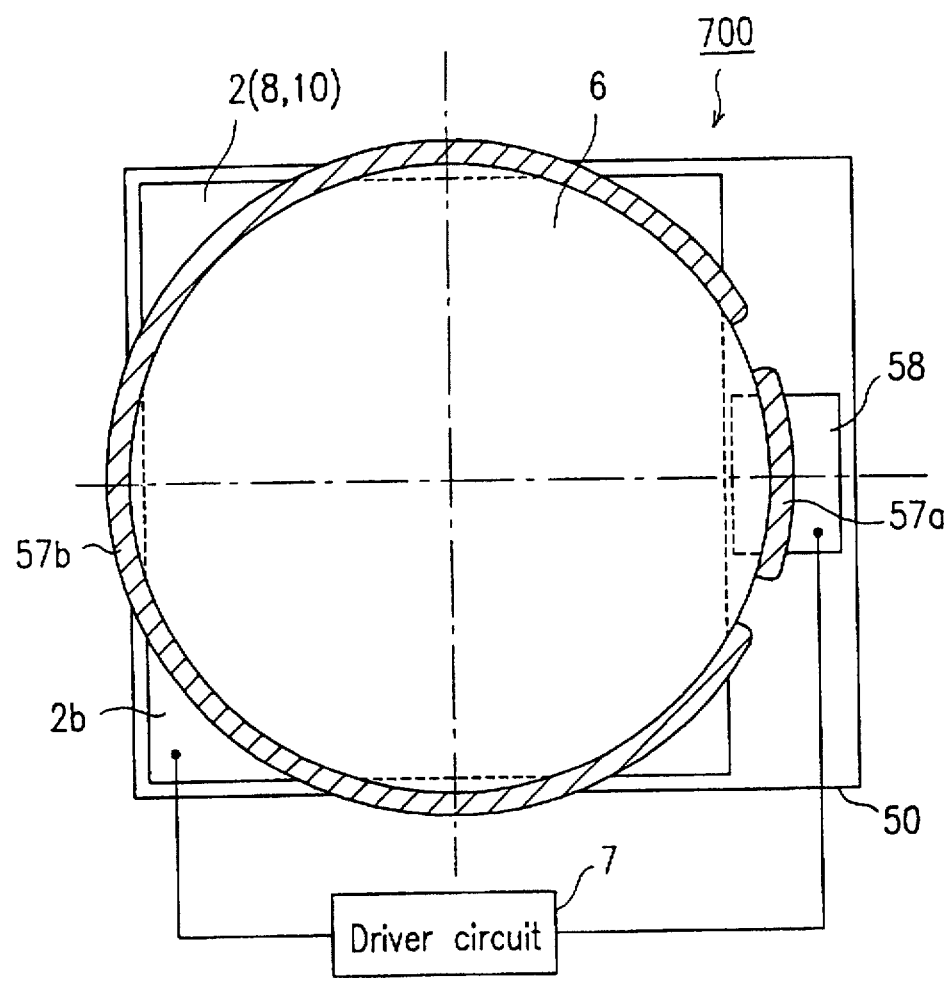
FIG. 22 is a plan view of the deformable mirror in the seventh example of the present invention as seen from above the substrate thereof.
Figure 23:
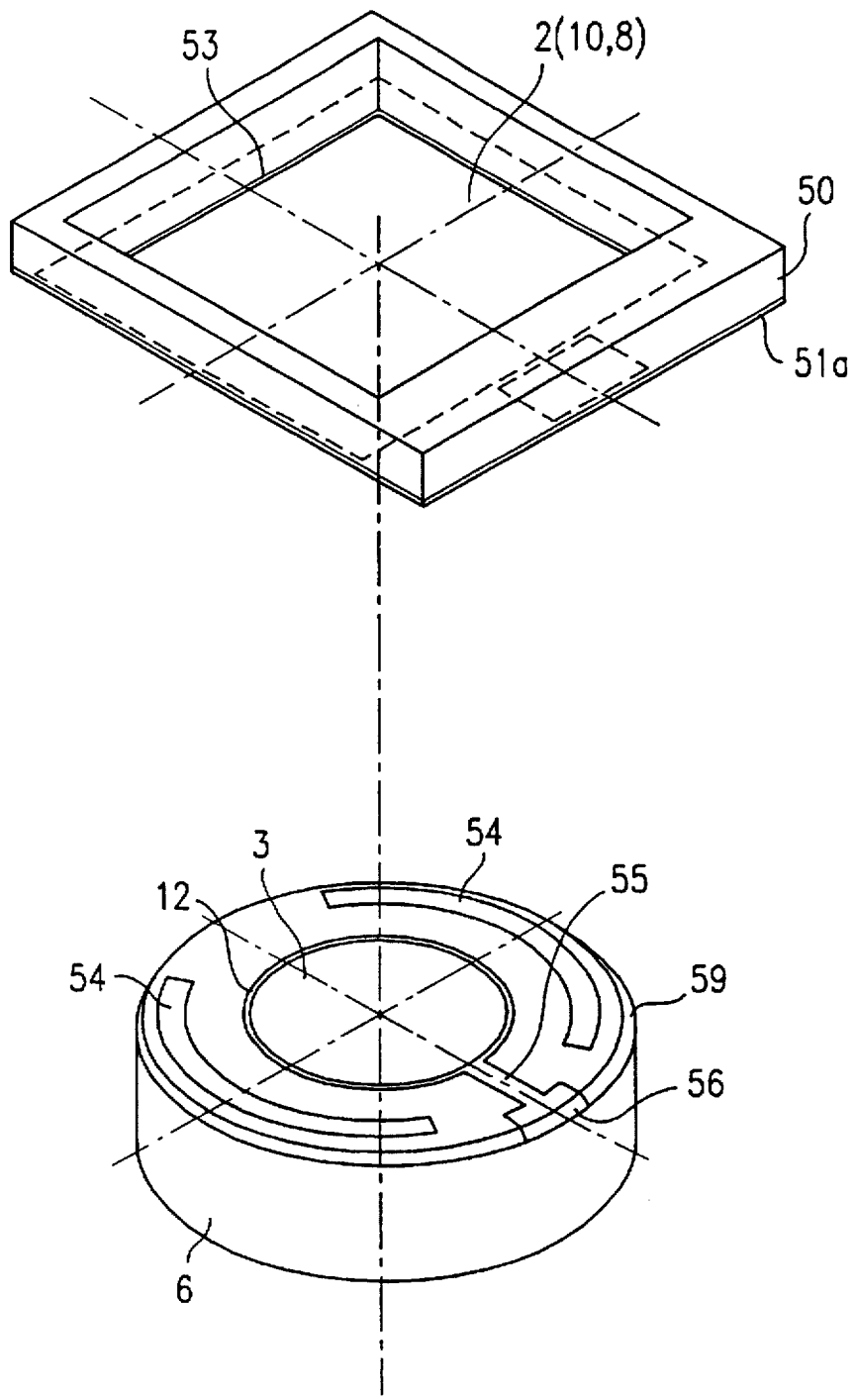
FIG. 23 is an exploded perspective view illustrating the configuration of the deformable mirror in the seventh example of the present invention.

FIGS. 20 to 23 are schematic views showing a configuration of a deformable mirror 700 in this seventh example. FIG. 20 is a plan view of the deformable mirror 700 as seen from an incoming light beam or from over the flexible member; FIG. 21 is a cross-sectional view of the deformable mirror 700 taken along the line X-X in FIG. 20; FIG. 22 is a plan view of the deformable mirror 700 as seen from over the substrate; and FIG. 23 is an exploded perspective view of the deformable mirror 700.

The deformable mirror 700 includes a single-crystalline silicon substrate 50 having a square opening 53, onto which the flexible member 2 is fixed. As shown in FIG. 21, the peripheral portion of the flexible member 2 is secured onto the silicon substrate 50 via an insulating film 51a which may be formed of a thermally oxidized silicon film. The flexible member 2 is fixed on the silicon substrate 50 in a state where a tensile stress is applied to the flexible member 2.

The flexible member 2 includes an upper electrode layer 8 and the reflective film 10, a shown in FIG. 21. The upper electrode layer 8 is formed, for example, of a nickel film having a thickness of about 5 μm. The reflective film 10 is formed, for example, of a thin film made of gold, aluminum or the like having a thickness of about 1 μm. Alternatively, the surface of the upper electrode layer 8 may be directly used as a reflective surface without providing the reflective film 10 thereon.

The substrate 6 is formed to have the uneven portion 3 by, for example, a glass molding method or a resin molding method, as in the previous examples. Furthermore, a chamfered potion 59 is provided around the periphery of the upper surface of the substrate 6, as shown in FIGS. 21 and 23. On the surface of the substrate 6, the lower electrode layer 12, a wiring portion 55, a wiring pad 56 and spacer layers 54 (see FIG. 23) are provided. The insulating layer 9 is provided thereon except for the chamfered portion 59. Therefore, the insulating layer 9 is not in contact with the wiring pad 56 on the chamfered portion 59, as shown in FIGS. 21 and 23.

The lower electrode layer 12, which may be formed of a conductive material, such as aluminum, copper or platinum, is provided primarily over the uneven portion 3 of the substrate 6. The spacer layers 54 are formed to have the same thickness as that of the lower electrode layer 12. In this example, both the lower electrode layer 12 and the spacer layers 54 were made of aluminum having a thickness of about 1 μm. The insulating layer 9 is made of silicon oxide or the like to have a thickness of about 1 μm, for example. The wiring portion 55 for applying a voltage to the lower electrode layer 12 and the wiring pad 56 for establishing an electrical connection with a lower electrode pad 58 are formed of the same material as that of the lower electrode layer 12 and have approximately the same thickness as that of the lower electrode layer 12. The thicknesses of the lower electrode layer 12, the spacer layers 54, the wiring portion 55, the pad 58 and the insulating film 9 are set so that the upper surface of the insulating film 9 located above the spacer layers 54 is at the same height as that of the insulating film 9 located above the lower electrode layer 12 and the wiring portion 55, so as to keep the surface of the flexible member 2 flat when the substrate 50 part and the substrate 6 part are assembled and no voltage is applied across the electrode layers 8 and 12.

The silicon substrate 50, onto which the flexible member 2 is fixed, and the substrate 6, on which the lower electrode layer 12 and the insulating layer 9 are provided, adhere to each other such that the upper electrode layer 8 of the flexible member 2 faces the lower electrode layer 12 of the substrate 6, as shown in FIGS. 20, 21 and 22. The flexible member 2 is arranged to be in contact with the upper surface of the insulating layer 9 over the spacer layers 54 at the same height as that of the insulating layer 9 over the lower electrode layer 12 and the wiring portion 55 and can keep the surface thereof flat.

An adhesive made of an epoxy resin or the like having an electrical conductivity is used as the adhesive. The silicon substrate 50 and the substrate 6 are attached to each other via adhesives 57a and 57b as shown in FIG. 21. The adhesive 57a also functions as a member for establishing an electrical connection between the wiring pad 56 on the chamfered portion 59 of the substrate 6 and the lower electrode pad 58 formed over the silicon substrate 50 via the insulating film 51a as shown in FIGS. 20 and 21. By providing the chamfered portion 59 for the substrate 6, the wiring pad 56 can be exposed when the silicon substrate 50 and the substrate 6 are attached to each other. In addition, since the adhesives 57a and 57b come into close contact with this chamfered portion 59, the reliability of the adhesion can be improved and an electrical connection can be surely established between the wiring pad 56 and the lower electrode pad 58.

An exposed portion 2b of the flexible member 2 and the lower electrode pad 58 are connected to the driver circuit 7 by means of solder or the like (see FIG. 22). Thus, the driver circuit 7 can apply a voltage across the upper electrode layer 8 of the flexible member 2 and the lower electrode layer 12 via the exposed portion 2b of the flexible member 2 and the lower electrode pad 58 or discontinue the voltage application. In the case where the deformable mirror 700 reflects the light beam incident thereon without providing a spherical aberration to the light beam, the driver circuit 7 does not apply a voltage and the flexible member 2 is kept flat owing to the tensile stress applied to the member 2. On the other hand, in the case where a spherical aberration is provided to the incident light beam, the driver circuit 7 applies a voltage across the upper electrode layer 8 and the lower electrode layer 12. At this time, an electrostatic force is generated between the upper electrode layer 8 and the lower electrode layer 12 on the substrate 6, so that the flexible member 2 is deformed toward the substrate 6 so as to adhere by the electrostatic force to the uneven portion 3. As a result, a predetermined spherical aberration can be provided to the incoming light beam.

Figure 27:
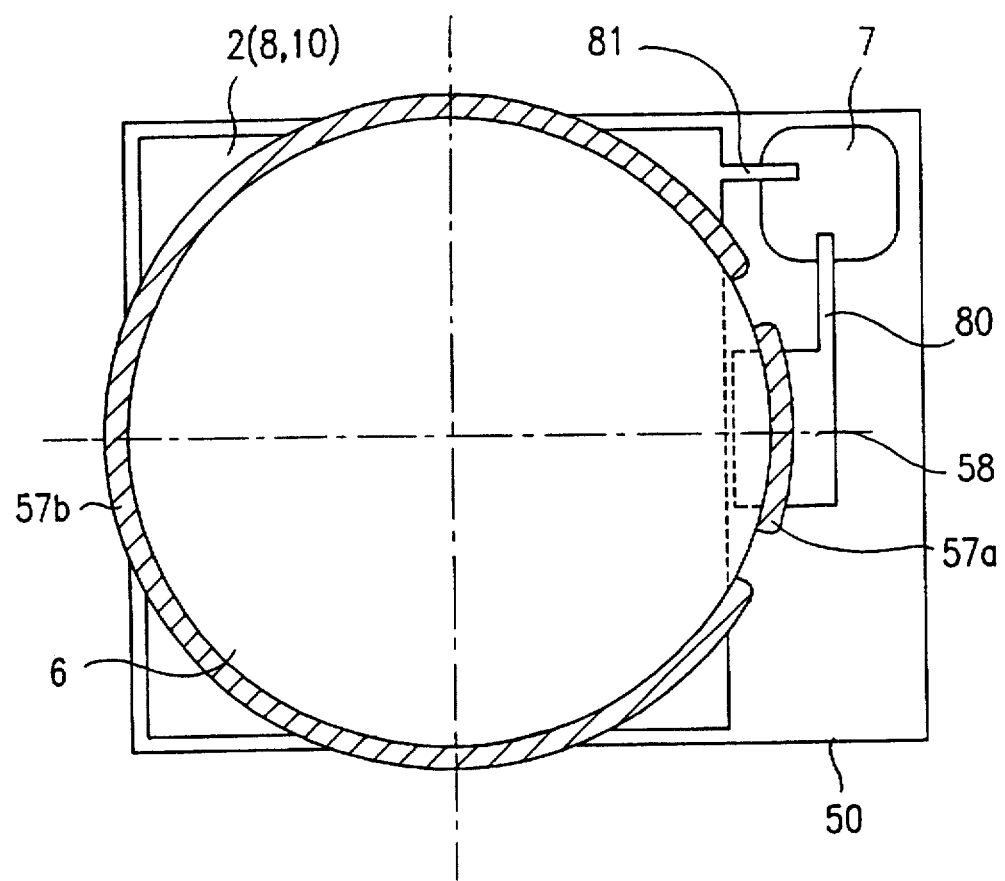
FIG. 27 is a plan view of a deformable mirror having another configuration in the seventh example of the present invention as seen from above the substrate thereof.

In this example, the drive circuit 7 is provided outside the deformable mirror 700. Alternatively, as shown in FIG. 27, the driver circuit 7 may be integrally formed on the silicon substrate 50 through a semiconductor fabrication process, thereby connecting the upper electrode layer 8 of the flexible member 2 to the driver circuit 7 via a wiring 81 and the lower electrode pad 58 to the driver circuit 7 via a wiring 80.

Next, an example of a method for fabricating the deformable mirror 700 will be described with reference to FIGS. 24A to 24G.

FIGS. 24A to 24G are cross-sectional views showing respective process steps for fabricating the silicon substrate 50 portion of the deformable mirror 700. The following process steps are performed.

Figure 24A:
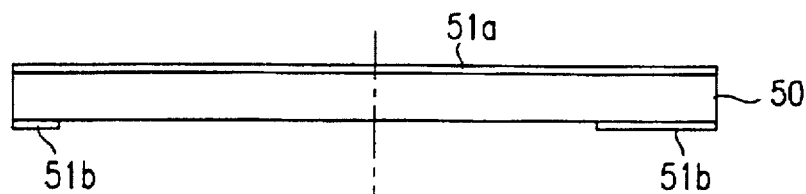
FIGS. 24A to 24G are cross-sectional views showing respective process steps for fabricating the supporting substrate portion of the deformable mirror in the seventh example of the present invention.

(1) First, as shown in FIG. 24A, silicon oxide films 51a and 51b are respectively formed on the upper surface and the lower surface of the single-crystalline silicon substrate 50 having a (100) plane orientation by a thermal oxidation method. It is noted that the upper surface of the silicon substrate 50 has been subjected to a rubbing or polishing treatment and that the flatness thereof has been 1 nm or less. Next, a photoresist (not shown) is placed onto the lower surface of the silicon substrate 50 and then patterned to form a photomask having a rectangular shape (see FIGS. 20 and 21) corresponding to the shape of the opening 53. Using the photomask, a rectangular opening is formed through the thermally oxidized film 51b on the lower surface of the silicon substrate 50 by performing a dry etching using $CHF_3$ gas.

Figure 24B:
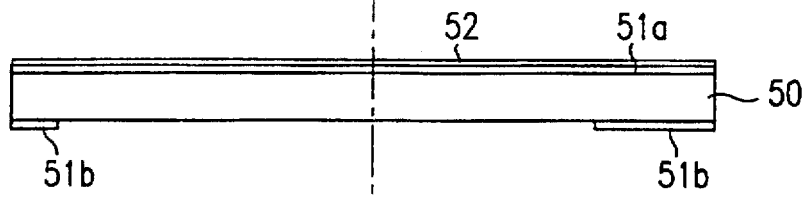

(2) Next, as shown in FIG. 24B, a tantalum film (not shown) or the like having a thickness of about 0.01 μm and a nickel film 52 or the like having a thickness of about 0.1 μm are deposited by a sputtering method as a part of the flexible member 2 on the thermally oxidized film 51a on the upper surface side. The tantalum film is formed for enhancing the adhesion strength between the silicon oxide film 51a and the nickel film 52.

Figure 24C:
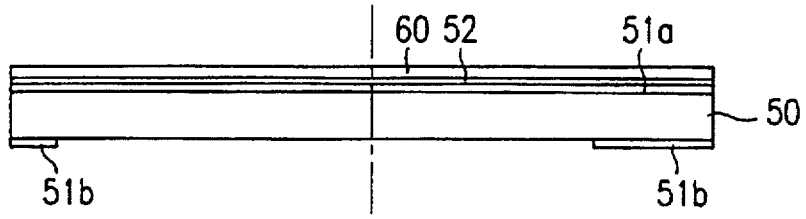

(3) Next, as shown in FIG. 24C, a nickel-plated film 60 having a predetermined thickness (e.g., about 5 μm) is formed on the nickel film 52 are the remaining part of the flexible member 2 by an electrolytic plating method using the nickel film 52 as an electrode. During this electroplating, a tensile stress is applied to the nickel-plated film 60.

Herein, a series of electroplating steps for forming the nickel-plated film 60 to which the tensile stress is applied will be described in detail below.

Figure 25:
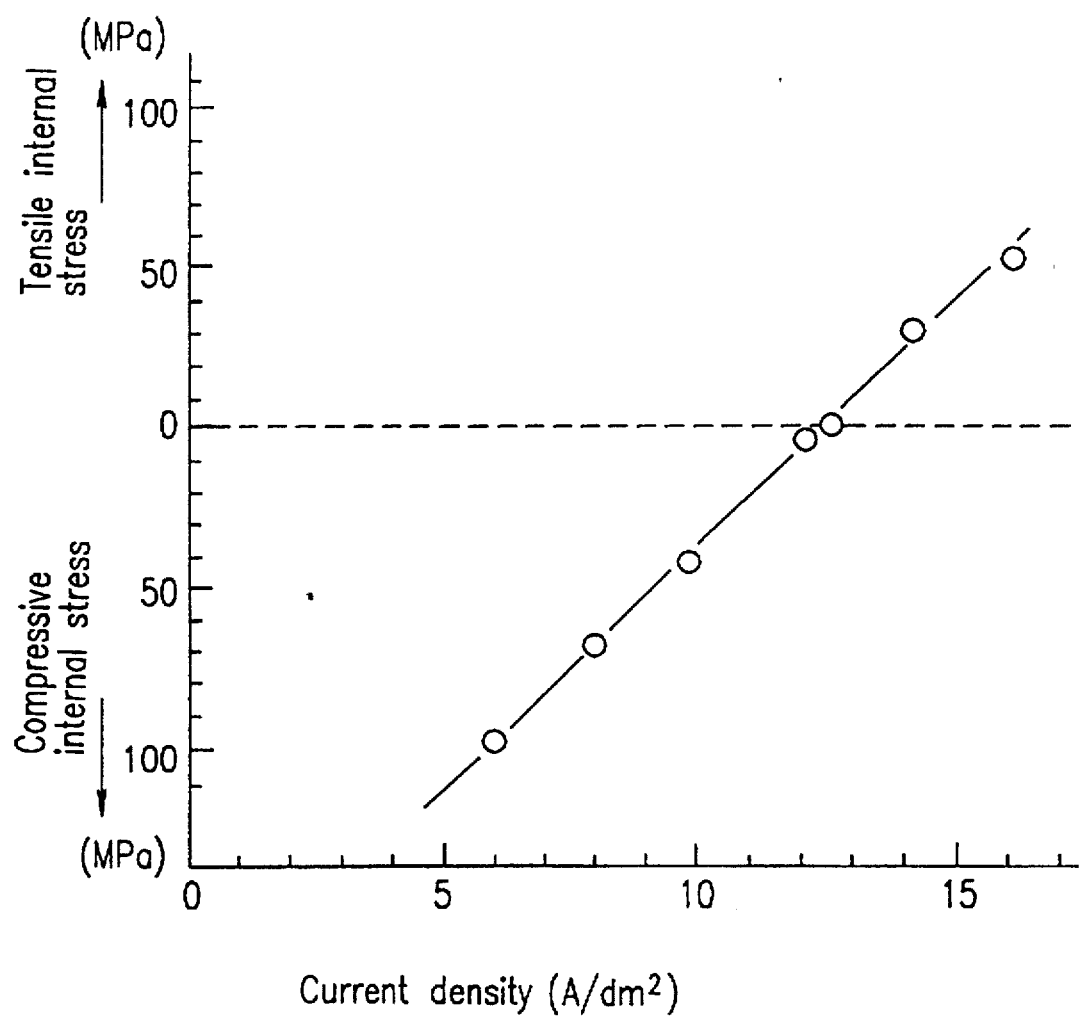
FIG. 25 is a graph showing a relationship between the internal stress of a nickel film formed by an electroplating method and a current density.

In the case where 600 g/l of nickel sulfonamide, 5 g/l of nickel chloride and 30 g/l of boric acid are used as the electrolytic bath for plating nickel and the bath temperature is set to be 60° C., the relationship between the internal stress of the nickel film to be electroplated and the current density can be represented as shown in FIG. 25.

In FIG. 25, the X-axis indicates the current density, while the Y-axis indicates the internal stress of the nickel film. As shown in FIG. 25, the internal stress of the nickel film can be controlled by controlling the current density during the electroplating. For example, when an internal stress of 50 Mpa is applied to the nickel-plated film 60, the electroplating is performed at a current density of 16 A/dm$^2$.

Figure 24D:
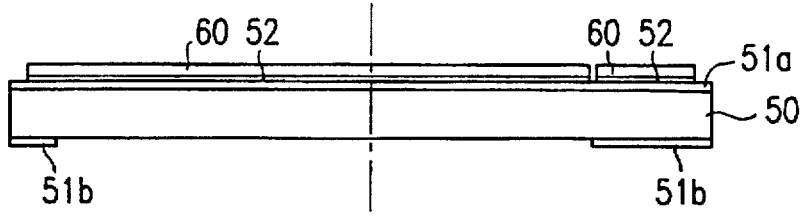

(4) Next, as shown in FIG. 24D, a photoresist (not shown) is placed onto the nickel-plated film 60. Then, the photoresist is patterned via photolithography to form a photomask having patterns corresponding to the shapes of the flexible member 2 and the lower electrode pad 58 (see FIG. 22). Subsequently, an etching is performed using the photomask, thereby patterning the nickel-plated film 60 and the nickel film 52 (having a thickness of about 0.1 μm).

Figure 24E:
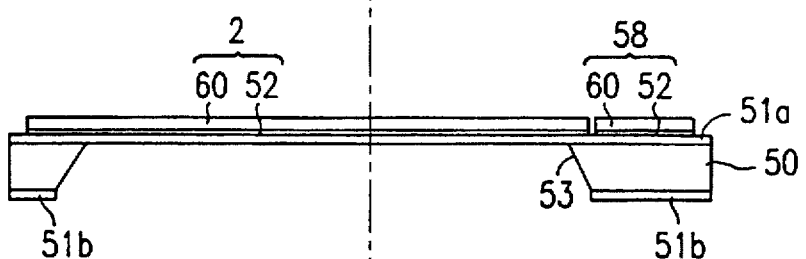

(5) Next, as shown in FIG. 24E, a wet etching is performed by immersing the silicon substrate 50 in a potassium hydroxide solution and using the thermally oxidized film 51b as a mask such that the silicon substrate 50 is etched from the lower surface toward the upper surface thereof, thereby partially removing silicon and forming the opening 53. If a single crystalline silicon substrate is etched by using potassium hydroxide, then an anisotropic etching can be performed, so that the etching rate in the direction of (1, 0, 0) crystal plane orientation becomes high while the etching rate in the direction of (1, 1, 1) crystal plate orientation becomes extremely low. Therefore, a tapered opening 53 such as that shown in FIG. 24E is formed. In such a case, it is possible to form the opening in the shape determined by the pattern of the thermally oxidized film 51b with high precision. At the same time, on the upper surface side, the tantalum film is also removed using the nickel-plated film 60 and the nickel film 52 as a mask. As a result, one portion of the nickel-plated film 60 and the nickel film 52 becomes the flexible member 2 and the other portion of the nickel-plated film 60 and the nickel film 52 becomes the lower electrode pad 58.

Figure 24F:
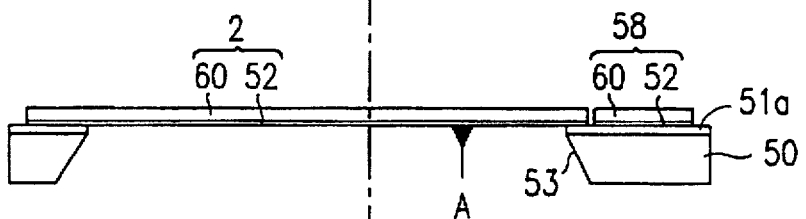

(6) Next, as shown in FIG. 24F, a dry etching is performed from the lower surface of the substrate 50 by using $CHF_3$ gas, thereby removing the thermally oxidized film 51b on the lower surface, the thermally oxidized film 51a and the tantalum film which is located on the bottom surface of the opening 53. As a result, a plane A to which a planar shape having an excellent flatness on the upper surface of the silicon substrate 50 has directly been transcribed appears. Thus, this plane A can be used as an excellent optical mirror.

Figure 24G:
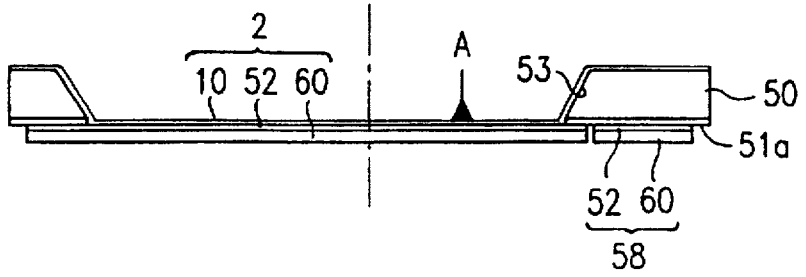

(7) Finally, if necessary, an aluminum film having a thickness of about 1 μm is deposited as the reflective film 10 (see FIG. 21) on the nickel film 52 by a sputtering method or the like as shown in FIG. 24G, thereby further improving the reflectance of the plane A.

Next, the fabrication process steps of the substrate 6 part will be described. FIGS. 26A to 26D are cross-sectional views showing respective process steps for fabricating the substrate 6 portion of the deformable mirror 700.

Figure 26A:
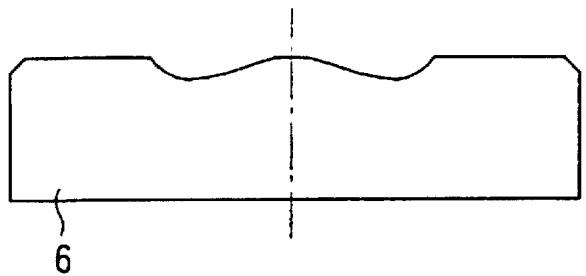
FIGS. 26A to 26D are cross-sectional views showing respective process steps for fabricating the substrate portion of the deformable mirror in the seventh example of the present invention.

(a) First, as shown in FIG. 26A, the substrate 6 having the uneven portion 3 is formed by a glass molding method or a resin molding method.

Figure 26B:
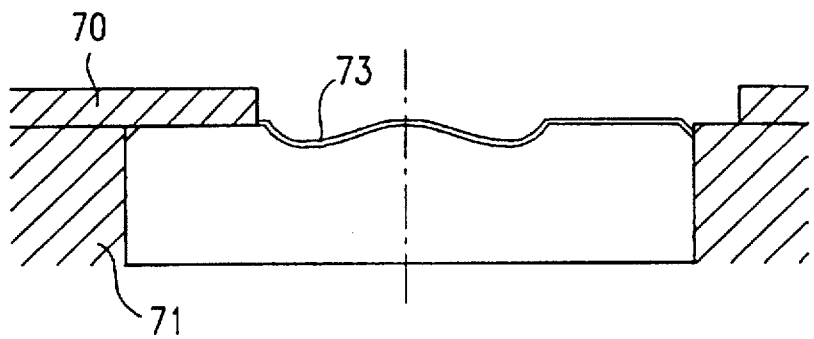

(b) Next, as shown in FIG. 26B, the substrate 6 is held by a holder 71 and the upper surface of the substrate 6 is partially covered with a metallic mask 70 which has an opening corresponding in shape to the lower electrode layer 12, the wiring portion 55, the wiring pad 56 and the spacer layers 54 and which is formed by etching a stainless steel plate or the like. Then, an aluminum film 73 having a thickness of about 1 μm is deposited by a sputtering method or the like on portions of the substrate 6 exposed through the opening of the metallic mask 70, that is, portions corresponding to the lower electrode layer 12, the wiring portion 55, the wiring pad 56 and the spacer layers 54.

Figure 26C:
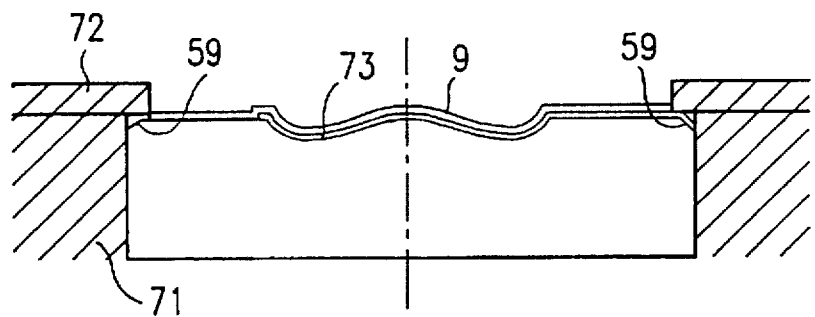
Figure 26D:
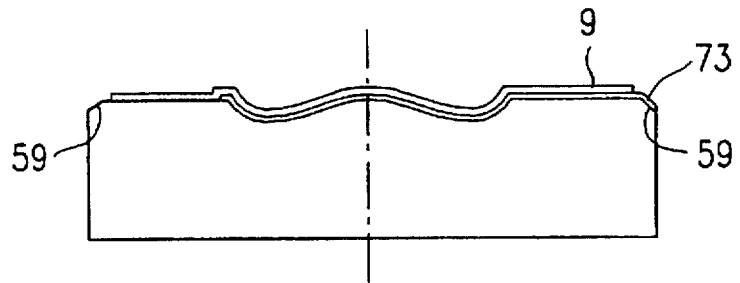

(c) Subsequently, as shown in FIG. 26C, the upper surface of the substrate 6 held by the holder 71 is partially covered with another metallic mask 72 having an opening so that the chamfered portion 59 of the substrate 6 is covered by the mask 72. Then, a silicon oxide film 9 having a thickness of about 1 μm is deposited by a sputtering method or the like on the portions of the substrate 6 exposed through the opening of the metallic mask 72, that is, the entire upper surface of the substrate 6 other than the chamfered portion 59.

As described above, since the flexible member 2 is formed by a semiconductor fabrication process in accordance with this method, the flexible member 2 can be formed with high precision and the surface onto which a light beam is incident can be formed in a more precise shape. In addition, since the flexible member 2 and the lower electrode pad 58 can be formed in a series of processes, the fabrication processes can be simplified.

Moreover, the deformable mirror 200 may be modified as in the modifications of Example 1. In this case, the advantageous effects described in the above modifications can also be obtained.

EXAMPLE 8

Figure 28:
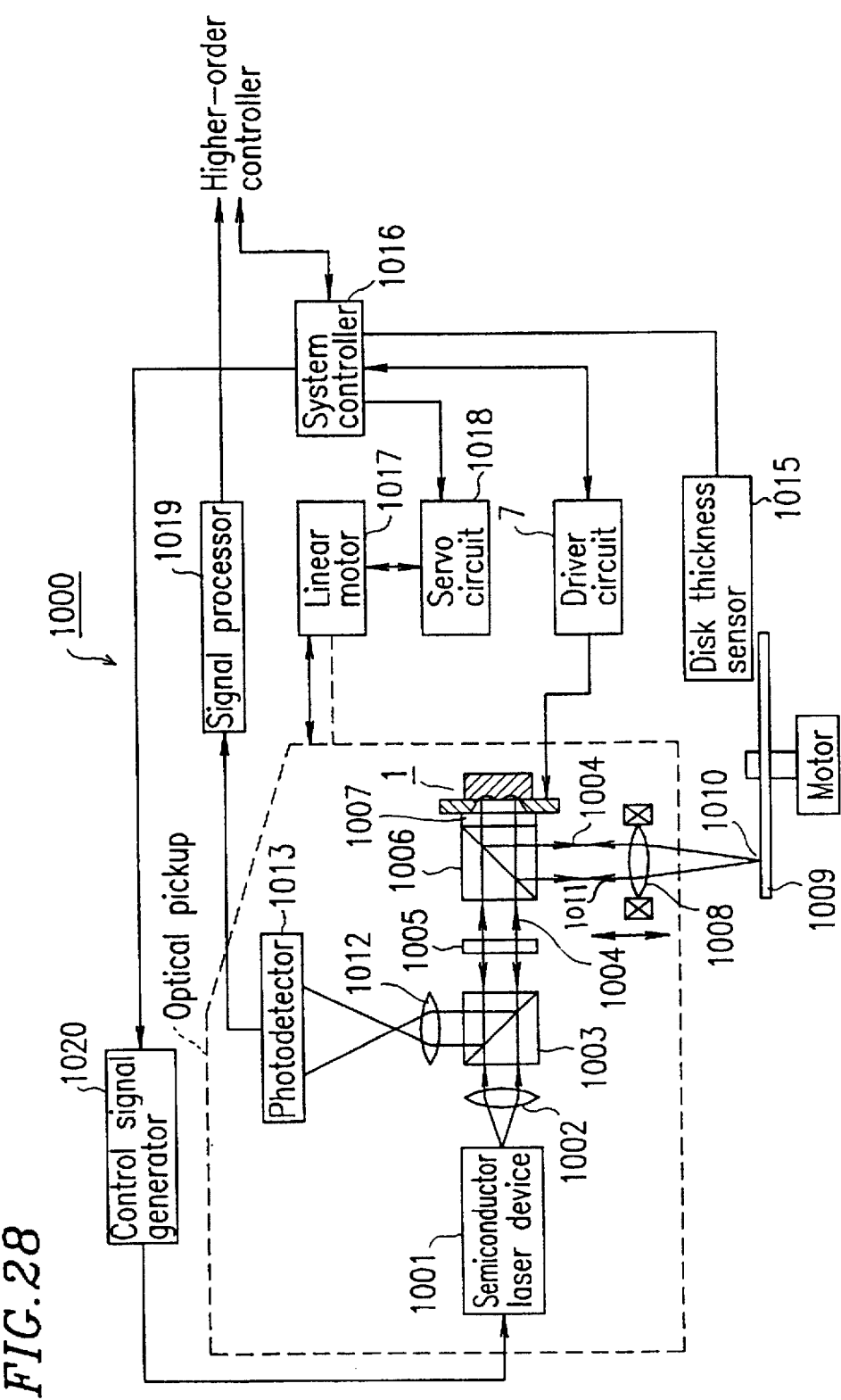
FIG. 28 is a block diagram showing an exemplary configuration of the recording and reproducing apparatus according to the present invention.

FIG. 28 is a schematic block diagram showing an exemplary configuration of a recording and reproducing apparatus 1000 according to the present invention. The apparatus 1000 uses any one of the above-described deformable mirrors as a part of the optical system thereof. Hereinafter, the configuration of the recording and reproducing apparatus 1000 will be described with reference to FIG. 28. In the following description, a recording and reproducing apparatus, which can be used for two kinds of optical disks having substrate thicknesses of about 0.6 mm and about 1.2 mm, respectively, and which includes the deformable mirror of Example 1, will be described as an example.

As shown in FIG. 28, a beam 1004 emitted from a semiconductor laser device 1001 passes through a collimator lens 1002 to be incident on a beam splitter 1003. The beam 1004 is a linearly polarized light which is allowed to pass through the beam splitter 1003 when the beam 1004 is emitted from the laser device 1001. Thus, the beam 1004 is transmitted by the beam splitter 1003 and then passes through a quarter-wave plate 1005 to reach a beam splitter 1006. Since the polarization of the beam 1004 is changed when passing through the quarter-wave plate 1005, the beam splitter 1006 also transmits the beam 1004.

The beam 1004 reaches the deformable mirror 1 after having passed through the beam splitter 1006 and a quarter-wave plate 1007. The light reflected by this deformable mirror 1 is transmitted through the quarter-wave plate 1007 to reach the beam splitter 1006. At this time, the beam splitter 1006 reflects the beam 1004 because the polarization of the beam 1004 is changed due to the quarter-wave plate 1007. Then, the beam 1004 is incident onto an objective lens 1008 and is converged by the objective lens 1008 so as to form a light spot 1010 on an optical disk 1009.

The light beam 1011 reflected by the optical disk 1009 returns through the objective lens 1008 toward the beam splitter 1006. After being reflected by the beam splitter 1006, the light beam 1011 passes through the quarter-wave plate 1007 and is then again incident on the deformable mirror 1. Then, the light beam 1011, reflected by the deformable mirror 1, passes through the quarter-wave plate 1007, the beam splitter 1006 and the quarter-wave plate 1005, and reaches the beam splitter 1003. The beam splitter 1003 reflects the light beam 1011 toward a lens 1012 so that the light beam 1011 is focused onto a photodetector 1013. The photodetector 1013 generates an electrical signal in accordance with the light amount of the light beam 1011 incident thereon.

The electric signal generated by the photodetector 1013 is sent to a higher-order controller via a signal processor 1019, and is subjected to signal processing to obtain an information signal corresponding to information recorded on the optical disk 1009 and servo signals which are used for controlling the position of the objective lens 1008 relative to the optical disk 1009. The obtained servo signals are supplied to a servo circuit 1018 via a system controller 1016. The servo circuit 1018 actuates a linear motor 1017 to move an optical pickup including the objective lens 1008 in a direction perpendicular to the optical disk 1009 and/or a direction parallel to the radial direction of the optical disk 1009.

The objective lens 1008 has been designed to be usable for an optical disk having a substrate thickness of about 0.6 mm. Thus, in this eighth example, the state of the deformable mirror 1 is transformed in accordance with the thickness of the installed optical disk 1009, thereby matching the focusing property of the objective lens 1008 with the optical disk 1009. That is to say, when a disk having a thickness of about 1.2 mm has been installed, the deformable mirror 1 is deformed to provide the light beam 1004 with a spherical aberration, thereby matching the focusing property of the objective lens 1008 with the optical disk 1009. Thus, the light beam 1004 can be focused onto the disk in an appropriate manner for the recording and reproducing operations, even in the case of the disk having a substrate thickness of about 1.2 mm.

It is noted that the deformable mirror 1 is a plane mirror when it is not deformed, as described in Example 1. Hereinafter, the operation of the deformable mirror 1 will be described.

Figure 29:
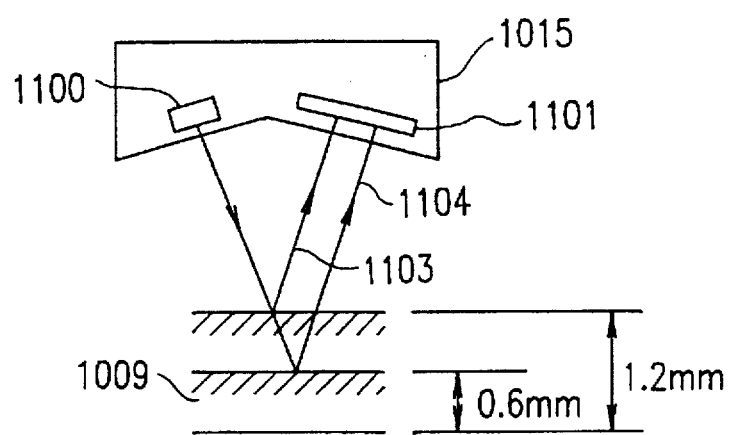
FIG. 29 is a diagram illustrating the disk thickness sensor shown in FIG. 28.

First, a disk thickness sensor 1015 provided over the optical disk 1009 determines whether the thickness of the installed disk is 0.6 mm or 1.2 mm. The disk thickness sensor 1015 has a configuration such as that shown in FIG. 29. More specifically, the disk thickness detector 1015 includes a light source 1100 and a light position detector 1101. In this disk thickness sensor 1015, a light beam 1102 is emitted from the light source 1100 and is reflected by the upper surface of the optical disk 1009. When the optical disk 1009 has a thickness of about 0.6 mm, the reflected light is incident onto the light position detector 1101 through an optical path 1104. On the other hand, when the optical disk 1009 has a thickness of about 1.2 mm, the reflected light is incident onto the light position detector 1101 through an optical path 1103. Therefore, the thickness of the disk 1009 can be determined by making the light position detector 1101 detect the position of the reflected light.

Next, referring to FIG. 28 again, the system controller 1016 receives information about the thickness of the disk from the disk thickness sensor 1015, thereby actuating the driver circuit 7 for the deformable mirror 1, if necessary. In this step, when the optical disk 1009 has a thickness of about 0.6 mm, the driver circuit 7 does not deform the deformable mirror 1. On the other hand, when the optical disk 1009 has a thickness of about 1.2 mm, the driver circuit 7 deforms the deformable mirror 1, thereby causing the flexible member of the deformable mirror 1 to adhere by an electrostatic force to the reference surface of the substrate. In the case of using the deformable mirror 500 of Example 5, an electromagnetic force is generated to deform the deformable mirror. As a result, a predetermined spherical aberration is provided to the light beam 1004 reflected by the deformable mirror 1 and the objective lens 1008 can focus the light beam 1004 in an appropriate manner for the recording and reproducing operations with respect to the optical disk 1009 having a thickness of about 1.2 mm.

Figure 30:
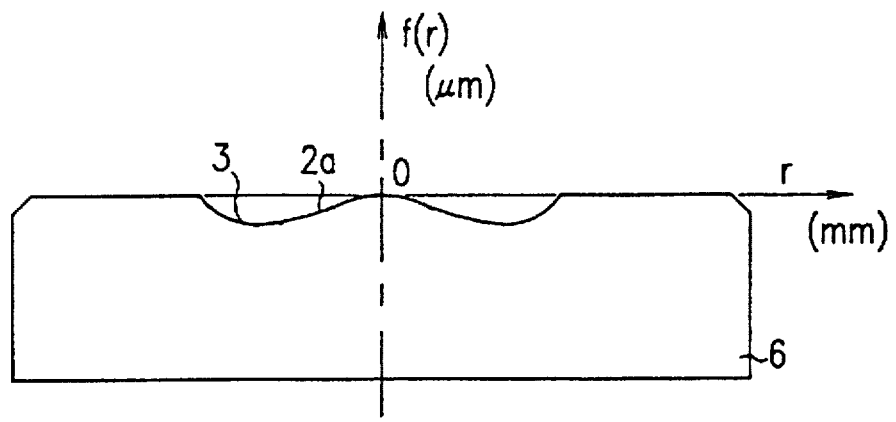
FIG. 30 is a cross-sectional view showing an exemplary design of the uneven portion of the deformable mirror.

In this case, the uneven portion of the deformable mirror 1 can be formed in any arbitrary shape so long as the mirror surface 2a of the flexible member 2 which adheres to the uneven portion has a shape which can be represented by the following Equation 1, where r (mm) is a radius from the center of the mirror surface 2a and f(r) (µm) is the shape of the mirror surface 2a as shown in FIG. 30.

$$f(r)=3.3168\times10^{-2}\cdot r^6-3.9542\times10^3\cdot r^4-0.505\cdot r^2 \quad (1)$$

Figure 31:
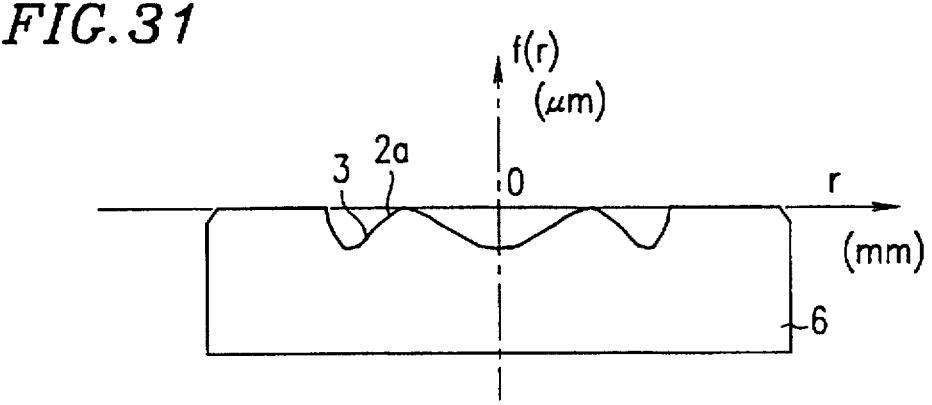
FIG. 31 is a cross-sectional view showing another exemplary design of the uneven portion of the deformable mirror.
Figure 32:
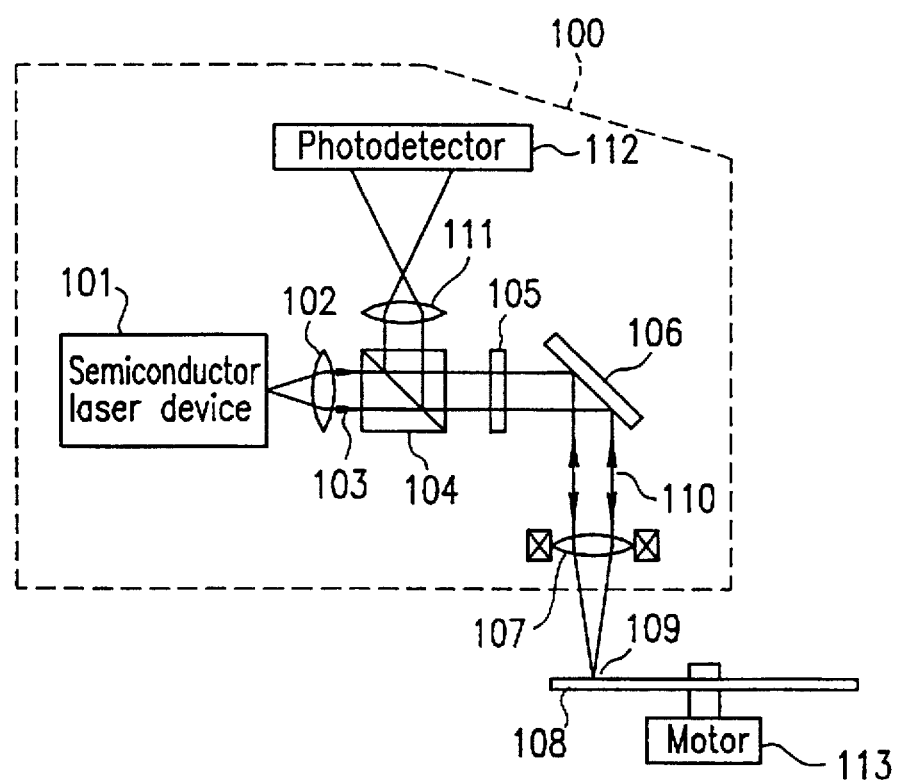
FIG. 32 is a block diagram showing an arrangement of a conventional optical pickup.
Figure 33:
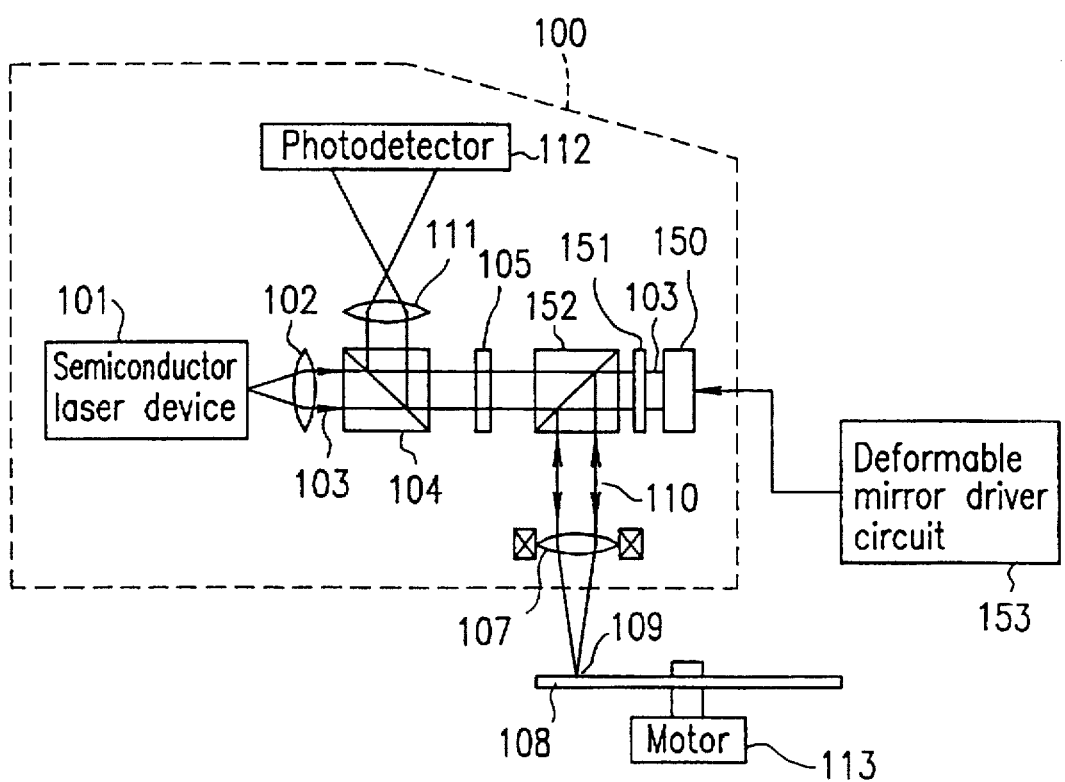
FIG. 33 is a block diagram showing an arrangement of an optical pickup using a conventional deformable mirror.
Figure 34:
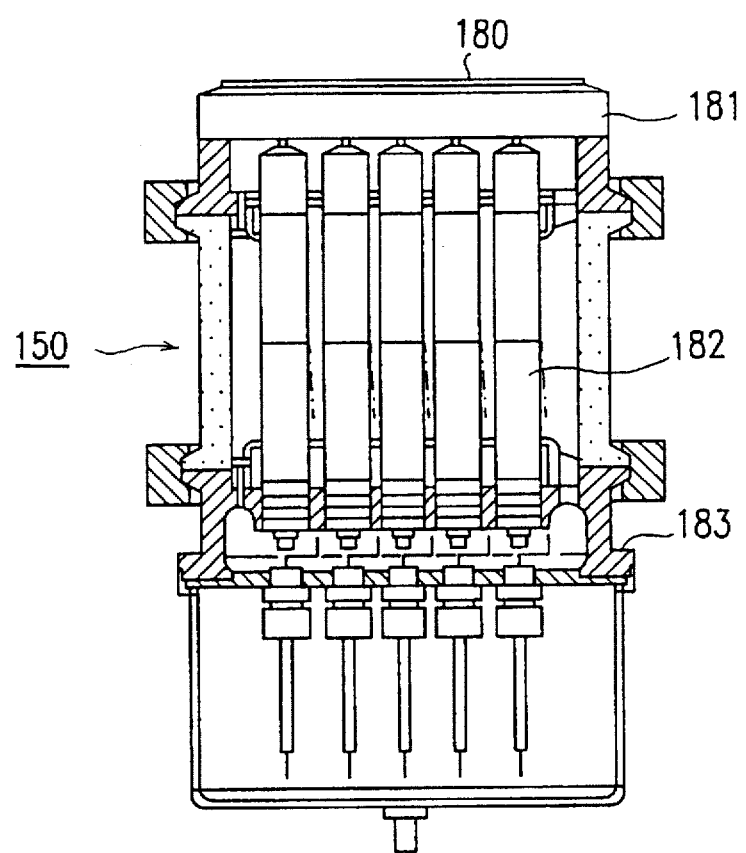
FIG. 34 is a view showing a configuration of a conventional deformable mirror.

In the above-described example, an objective lens designed to be matched with an optical disk having a substrate thickness of about 0.6 mm is used as the objective lens 1008. Thus, no spherical aberration is provided to the light beam 1004 in the case of the optical disk having the substrate thickness of about 0.6 mm, whereas a spherical aberration is provided by the deformable mirror 1 to the light beam 1004 in the case of an optical disk having a substrate thickness of about 1.2 mm. However, the present invention is also applicable to the opposite case. In such a case, the uneven portion of the deformable mirror 1 can be formed in any arbitrary shape so long as the mirror surface 2a of the flexible member 2, which is to adhere to the uneven portion, has a shape represented by the following Equation 2, where r (mm) is a radius from the center of the mirror surface 2a and f(r) (µm) is the shape of the mirror surface 2a as shown in FIG. 31.

$$f(r)=-2.2\times10^{-1}+3.4868\times10^{-1}\cdot r^2-1.277\times10^{-1}\cdot r^4=1.6348\times10^{-2}\cdot r^6+ 7.0052\times10^{-3}\cdot r^8 \quad (2)$$

However, since an optical disk having a substrate thickness of about 0.6 mm has a high recording density, a higher positional precision is required for the optical members to be used as compared with the case of reproducing information from an optical disk having a substrate thickness of about 1.2 mm, such as a CD. In accordance with the results obtained by performing a device simulation by the inventors, the potential precision required for the optical members may be less strict if a light beam, to which a spherical aberration has been applied, is incident in reproducing information from a disk having a substrate thickness of about 1.2 mm. Thus, when the deformable mirror 1 is a plane mirror, it is desirable to reproduce information from an optical disk having a substrate thickness of about 0.6 mm. On the other hand, when the deformable mirror 1 is deformed, it is desirable to reproduce information from an optical disk having a substrate thickness of about 1.2 mm.

In this eighth example, the state of the deformable mirror 1 is varied in accordance with the sensing results obtained by the disk thickness sensor 1015.

However, the present invention is not limited thereto. For example, the state of the deformable mirror 1 may also be varied when the information recorded on the optical disk 1009 cannot be read out.

Moreover, the recording and reproducing apparatus according to the present invention is not limited to that shown in FIG. 28. Alternatively, any arbitrary recording and reproducing apparatus may also be used so long as the apparatus can make an objective lens converge and light reflected by the deformable mirror onto an optical disk. Therefore, the deformable mirror is not always required to be disposed vertically to the incident light as shown in FIG. 28. However, when the deformable mirror is not vertical to the incident light, the shape of the beam incident onto the deformable mirror becomes allipsoidal, so that it becomes somewhat difficult to fabricate an appropriate deformable mirror.

As described above, according to the present invention, when a spherical aberration needs to be provided to a light beam, a deformable mirror is deformed by making the flexible member adhere to the uneven portion (or the reference surface) of the substrate. Thus, by forming the substrate having a large rigidity and a small coefficient of linear expansion, such as a glass material, it is possible to suppress the amount of displacement caused by environmental variations to a minimal level. In addition, if the adhering force of the flexible member with respect to the uneven portion of the substrate is set to be sufficiently high, even when a driving force is varied to a certain degree, the adhering force with respect to the uneven portion is not considerably weakened. Consequently, the shape of the mirror surface formed on the flexible member can be kept constant with high precision.

Moreover, in a deformable mirror, the flexible member is fixed by applying a tensile stress thereto. Thus, even if an ambient temperature rises and the flexible member expands when the deformable mirror is not deformed, the tension absorbs this expansion force, thereby preventing a deformation such as a buckling. On the contrary, since the tension becomes larger if the temperature falls, the mirror surface can be kept flat. In addition, since a tension has been applied to the flexible member, the eigenfrequency of the flexible member can be increased. Even when an external vibration is applied to the mirror, it is possible to suppress the displacement of the flexible member at an optically negligible level.

Furthermore, in a deformable mirror in accordance with an embodiment, an electrostatic force generated between two electrodes is utilized as a driving force which makes the flexible member adhere to the uneven portion of the substrate. Thus, the configuration of the deformable mirror can be simplified, i.e., it is only necessary to provide two flat electrodes for the flexible member and the substrate, respectively.

Also, in a deformable mirror in accordance with another embodiment, a magnetic force is utilized as a driving force for making the flexible member having the soft magnetic film formed thereon. Thus, a constant and precise mirror surface is realized by setting the magnetic force to an appropriate value.

Furthermore, in a deformable mirror in accordance with still another embodiment, an atmospheric pressure is applied to the flexible member, thereby making the flexible member adhering to the uneven portion of the substrate. As a result, a constant and precise mirror surface is realized and the configuration can be considerably simplified.

Furthermore, in a deformable mirror in accordance with still another embodiment, an air hole (such as a groove, a tiny hole or a through hole) is provided through the uneven portion on the substrate or the flexible member for pushing out the air existing in the gap between the uneven portion and the flexible member. Thus, the air to be compressed when the flexible member adheres to the uneven portion can be pushed out through the air hole. As a result, the flexible member can adhere to the uneven portion more easily.

Furthermore, in a deformable mirror in accordance with still another embodiment, the flexible member is fixed on the supporting substrate and is retained over the substrate via the supporting substrate. Thus, it is possible to form the flexible member with high precision, while performing deposition and photo-lithography processes for the supporting substrate. In addition, if a wiring pad for establishing an electrical connection with an external circuit is provided for by the supporting substrate, then the connection is realized more easily.

Furthermore, in a deformable mirror in accordance with still another embodiment, the supporting substrate is made of a single crystalline silicon. Thus, the flexible member can be formed with high precision by utilizing a semiconductor fabrication process. In addition, the mass production of such a flexible member is realized by the use of a batch process and a controller for driving the flexible member can be integrally formed on the silicon substrate.

In accordance with a preferred method for fabricating the deformable mirror, the flexible member is formed by utilizing an electroplating method. Thus, a predetermined tensile stress can be applied to the flexible member by controlling the current density, for example.

In accordance with an optical apparatus of the present invention, light in optically different states, that is, light with no spherical aberration and light provided with a spherical aberration by the deformable mirror can be output depending upon whether or not the deformable mirror is deformed.

Furthermore, in accordance with an optical apparatus in an embodiment, a focusing condition including a position on the optical disk at which a light spot is formed and a size of the formed light spot and the like, can be changed depending upon whether or not the deformable mirror is deformed, even in the case of using a single objective lens.

Furthermore, by using an objective lens designed to be matched with one of two types of optical disks which requires optical members to be positionally adjusted with higher precision, a spherical aberration is not provided with one of the optical disk types, whereas, in the case of the other optical disk type, a spherical aberration needs to be provided to the light. Thus, when the optical disk requiring higher precision of positional alignment of the optical members is recorded or reproduced, it is necessary for the deformable mirror to be deformed, thus irradiating the optical disk with light more stably.

In accordance with a recording and reproducing apparatus in an embodiment, the state of the deformable mirror is changed depending upon a substrate thickness of the two kinds of optical disks having different substrate thicknesses. In this case, an optical disk having a thinner substrate thickness requires a higher precision in the positional alignment of the optical members. Therefore, the optical disk having the thinner substrate thickness is preferably irradiated with light with no spherical aberration while the deformable mirror is not deformed. Accordingly, even if any one of the optical members is displaced to a certain degree, information can be satisfactorily reproduced from the optical disk.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A deformable mirror for reflecting a light beam incident thereon, comprising:
   a flexible member which has a reflective surface and is flexibly deformable;
   a substrate having a reference surface which faces the flexible member; and
   a driving means for making the flexible member adhere to the reference surface of the substrate, thereby deforming the reflective surface of the flexible member to correspond to the reference surface,
   wherein the shape of the reference surface is designed in such a manner that the light beam is provided with a spherical aberration when the reflective surface adheres to the reference surface.

2. A deformable mirror according to claim 1, wherein the flexible member is arranged above the reference surface of the substrate, while a tensile stress is applied to the reflective surface of the flexible member so that the reflective surface serves as a flat mirror.

3. A deformable mirror according to claim 1, wherein the driving means includes:
   an upper electrode and a lower electrode arranged to face each other; and
   a driver circuit for applying a voltage across the upper electrode and the lower electrode to generate an electrostatic force therebetween,
   wherein the flexible member includes the upper electrode and the substrate includes the lower electrode, and wherein the flexible member adheres to the reference surface of the substrate by the electrostatic force.

4. A deformable mirror according to claim 1, wherein the driving means includes a soft magnetic layer, which is provided in the flexible member, and a magnetic force generating means, and wherein the flexible member adheres to the reference surface of the substrate by a magnetic force.

5. A deformable mirror according to claim 1, wherein the driving means includes an air pressure applying means for applying an air pressure to the flexible member.

6. A deformable mirror according to claim 1, wherein at least one of the flexible member and the substrate includes a portion for removing a volume of air from a space between the flexible member and the substrate when the flexible member adheres to the substrate.

7. A deformable mirror according to claim 6, wherein the portion has a groove shape formed on the reference surface of the substrate.

8. A deformable mirror according to claim 6, wherein the portion is a tiny hole formed through the flexible member.

9. A deformable mirror according to claim 6, wherein the portion is a through hole provided through the substrate.

10. A deformable mirror according to claim 1, further comprising a further substrate on which the flexible member is fixed.

11. A deformable mirror according to claim 10, wherein the further substrate comprises a single crystalline silicon.

12. An optical device including a deformable mirror according to claim 1 and an optical system for making a light beam incident on the deformable mirror and for receiving the light beam reflected by the deformable mirror.

13. An optical device according to claim 12, wherein the deformable mirror provides the light beam incident thereon with a spherical aberration when being deformed.

14. An optical device according to claim 12, wherein the optical system includes a lens which receives the light beam reflected by the deformable mirror, and wherein the lens focuses the light beam at a first point when the deformable mirror is not deformed, and wherein the lens focuses the light beam at a second point different from the first point when the deformable mirror is deformed.

15. An optical device according to claim 14, wherein the light beam is focused at the first point in a case where the optical members are required for being positionally adjusted with higher precision.

16. An apparatus for performing at least one of recording and reproducing operations, comprising:
   a light source;
   a deformable mirror having a reflective surface for reflecting a light beam which is incident on the reflective surface from a direction of the light source, the deformable mirror being capable of providing the light beam with a spherical aberration; and an objective lens for focusing the light beam reflected by the deformable mirror, the objective lens being designed to form a light spot on a first optical recording medium having a first substrate thickness in an appropriate focusing state for the operations of the first optical recording medium, wherein the deformable mirror includes:

a flexible member which has the reflective surface and is flexibly deformable;

a substrate having a reference surface which faces the flexible member; and a driving means for making the flexible member adhere to the reference surface of the substrate to deform the reflective surface in accordance with the reference surface, wherein the shape of the reference surface is designed to provide the light beam with the spherical aberration when the flexible member adheres to the reference surface, and wherein the focusing state of the light beam is changed to be appropriate for a second optical recording medium having a second substrate thickness different from the first substrate thickness, when the deformable mirror is deformed.

17. An apparatus according to claim 16, further comprising a discrimination means for discriminating the first optical recording medium and the second recording medium and for instructing the driving means of the deformable mirror to make the flexible member adhere to the substrate when at least one of the recording and reproducing operations is performed with respect to the second recording medium.

18. An apparatus according to claim 16, wherein, when an unknown optical recording medium is installed on the apparatus, the apparatus performs the reproducing operation with respect to the unknown optical recording medium assuming that the unknown optical recording medium is the first optical recording medium, and wherein a means is provided for instructing the driver means of the deformable mirror to make the flexible member adhere to the substrate so as to deform the deformable mirror, when information recorded onto the unknown optical recording medium is not correctly reproduced based on the light beam reflected from the unknown optical recording medium.

19. An apparatus according to claim 16, wherein the first substrate thickness is thinner than the second substrate thickness.

* * * * *